United States Patent
Krajewski, III et al.

(10) Patent No.: US 7,480,725 B2
(45) Date of Patent: Jan. 20, 2009

(54) TRANSPARENT RELOCATION OF AN ACTIVE REDUNDANT ENGINE IN SUPERVISORY PROCESS CONTROL DATA ACQUISITION SYSTEMS

(75) Inventors: John Joseph Krajewski, III, Huntington Beach, CA (US); Derrick C. Jones, Huntington Beach, CA (US); Abhijit Manushree, Aliso Viejo, CA (US); Douglas P. Kane, Silverado, CA (US)

(73) Assignee: Invensys Systems, Inc., Foxboro, MA (US)

( * ) Notice: Subject to any disclaimer, the term of this patent is extended or adjusted under 35 U.S.C. 154(b) by 672 days.

(21) Appl. No.: 10/944,476

(22) Filed: Sep. 16, 2004

(65) Prior Publication Data
US 2006/0059478 A1    Mar. 16, 2006

(51) Int. Cl.
G06F 15/16    (2006.01)
G06F 11/00    (2006.01)
(52) U.S. Cl. ........................................ 709/229; 714/13
(58) Field of Classification Search ................ 709/229, 709/225; 714/3, 12–13
See application file for complete search history.

(56) References Cited

U.S. PATENT DOCUMENTS

| | | | |
|---|---|---|---|
| 5,621,885 A | 4/1997 | Del Vigna, Jr. | |
| 6,622,261 B1 | 9/2003 | Laranjeira et al. | |
| 6,694,447 B1 | 2/2004 | Leach et al. | |
| 6,931,568 B2 | 8/2005 | Abbondanzio et al. | |
| 2003/0033412 A1* | 2/2003 | Sundaresan et al. | 709/227 |
| 2003/0220990 A1* | 11/2003 | Narayanan et al. | 709/220 |
| 2004/0030801 A1* | 2/2004 | Moran et al. | 709/244 |
| 2004/0151111 A1 | 8/2004 | Yarroll et al. | |
| 2004/0153709 A1 | 8/2004 | Burton-Krahn | |

FOREIGN PATENT DOCUMENTS

EP    1134658    * 9/2001

OTHER PUBLICATIONS

Xie et al. RSERPOOL Redundancy-model Policy Oct. 23, 2003, Interent Drafts.*
Xie et al. Endpoint Name Resolution Protocol (ENRP), Jun. 1, 2001. Internet Drafts.*
International Search Report for International Application No. PCT/US2005/032407 dated Jan. 20, 2006.

(Continued)

*Primary Examiner*—Larry D Donaghue
(74) *Attorney, Agent, or Firm*—Leydig, Voit & Mayer, Ltd

(57) ABSTRACT

A system is disclosed for providing transparency between fail-over host partners for data acquisition clients of a redundancy-enabled host in a supervisory process control data acquisition application runtime environment. The system includes a name resolution table for mapping location-independent reference names to network location-specific addresses. A location-independent name is assigned to the redundancy-enabled host comprising an active host partner and a standby host partner. A messaging infrastructure serves clients of the redundancy-enabled host. The messaging infrastructure maintains a name to address translation for each reference of the client to subscribed data on the redundancy-enabled host such that a same name is used to reference data on the redundancy-enabled host without regard to which one of the redundancy-enabled host partners is presently active.

20 Claims, 11 Drawing Sheets

OTHER PUBLICATIONS

International Search Report for International Application No. PCT/US05/32401 dated Feb. 9, 2006.

Wonderware Corporation *Configuring a "Hot Backup" Strategy for PLCS, I/O Servers, or InTouch Nodes*, Topic #: 000823, Sep. 23, 1999, Updated Jun. 29, 2001.

Written Opinion Of The International Searching Authority for International Application No. PCT/US05/32401.

Written Opinion Of The International Searching Authority for International Application No. PCT/US2005/032407.

International Search Report for International Application No. PCT/US05/32408 dated Dec. 5, 2006.

Written Opinion Of The International Searching Authority for International Application No. PCT/US05/32408.

* cited by examiner

1100 — Primary Network Timeout
1110 — Standby Engine Heartbeat Timeout
1120 — Active Engine Heartbeat Timeout
1130 — Consecutive Heartbeats Missed
1140 — Active Engine Timeout
1150 — Subscribed Engine Node Connection Timeout

TRANSPARENT RELOCATION OF AN ACTIVE REDUNDANT ENGINE IN SUPERVISORY PROCESS CONTROL DATA ACQUISITION SYSTEMS

TECHNICAL FIELD

The present invention generally relates to the field of networked computerized process control systems. More particularly, the present invention relates to supervisory process control and manufacturing information systems. Such systems generally execute above a control layer in a process control system to provide guidance to lower level control elements such as, by way of example, programmable logic controllers.

BACKGROUND

Industry increasingly depends upon highly automated data acquisition and control systems to ensure that industrial processes are run efficiently, safely and reliably while lowering their overall production costs. Data acquisition begins when a number of sensors measure aspects of an industrial process and periodically report their measurements back to a data collection and control system. Such measurements come in a wide variety of forms. By way of example the measurements produced by a sensor/recorder include: a temperature, a pressure, a pH, a mass/volume flow of material, a tallied inventory of packages waiting in a shipping line, or a photograph of a room in a factory. Often sophisticated process management and control software examines the incoming data, produces status reports, and, in many cases, responds by sending commands to actuators/controllers that adjust the operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial actions such as move equipment into and out of service as required.

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. When multiplied by thousands of sensors/control elements, this results in so much data flowing into the process control system that sophisticated data management and process visualization techniques are required.

Highly advanced human-machine interface/process visualization systems exist today that are linked to data sources such as the above-described sensors and controllers. Such systems acquire and digest (e.g., filter) the process data described above. The digested process data in-turn drives a graphical display rendered by a human machine interface. An example of such system is the well-known Wonderware IN-TOUCH® human-machine interface (HMI) software system for visualizing and controlling a wide variety of industrial processes. An IN-TOUCH HMI process visualization application includes a set of graphical views of a particular process. Each view, in turn, comprises one or more graphical elements. The graphical elements are "animated" in the sense that their display state changes over time in response to associated/linked data sources. For example, a view of a refining process potentially includes a tank graphical element. The tank graphical element has a visual indicator showing the level of a liquid contained within the tank, and the level indicator of the graphical element rises and falls in response to a steam of data supplied by a tank level sensor indicative of the liquid level within the tank. Animated graphical images driven by constantly changing process data values within data streams, of which the tank level indicator is only one example, are considerably easier for a human observer to comprehend than a steam of numbers. For this reason process visualization systems, such as IN-TOUCH, have become essential components of supervisory process control and manufacturing information systems.

Loss of data access to a process control system essentially blinds the HMI systems, and thus human managers, to the current status of a process control system. Therefore, maintaining reliable uninterrupted access by the above-described HMI systems to process control elements is very important, if not essential to the overall viability of a supervisory process control system. As a result, many systems incorporate redundancy, and an automated fail-over mechanism, into their data/control paths to ensure that human access to an automated process control system is not disrupted due to a single path/machine failure.

Such redundancy/fail-over functionality has been implemented in systems wherein duplicate components operate in parallel on separate machines in a same network area. In one redundant data delivery host implementation a second data delivery host system operates as an equivalent copy of the primary data delivery host system. Such implementation required duplicated communications, hardware, and software. Furthermore, the redundancy was not transparent to the clients of the data delivery system. As a result, each of the clients of the redundant data delivery system was required to be aware of the distinctly identified/named active and standby systems. Configuring/implementing/relocating redundant hosts in such systems substantially increases the cost of the system and the networks within which such systems operate.

SUMMARY OF THE INVENTION

The present invention addresses the potential need to provide better ways of implementing redundancy in hosts (e.g., data/message delivery servers/services) residing and operating within a supervisory process control environment supporting, by way of example, visualization applications for monitoring and managing elements of controlled industrial processes. The present invention facilitates configuring and deploying a redundant host pair in a supervisory process control and manufacturing information system wherein specified ones of the redundant host pair are treated as a single logical entity from the point of view of data acquisition system clients/subscribers. Such transparency potentially streamlines procedures associated with fail-over to a standby engine where the source of data changes. However, the reference strings used by clients are unaffected by the fail-over since each partner of the fail-over pair is referenced by the same name.

The above advantages are facilitated by a system, and related method performed by the system, that provides transparency between fail-over host partners for data acquisition clients of a redundancy-enabled host in a supervisory process control data acquisition application runtime environment. The system includes a name resolution table for mapping location-independent reference names to network location-specific addresses. A location-independent name is assigned to the redundancy-enabled host comprising an active host partner and a standby host partner. A messaging infrastructure serves clients of the redundancy-enabled host. The messaging infrastructure maintains a name to address translation for each reference of the client to subscribed data on the redundancy-enabled host such that a same name is used to reference data on the redundancy-enabled host without regard to which one of the redundancy-enabled host partners is presently active.

Other inventive aspects of the systems and methods disclosed herein address the configuration of such systems as well as their runtime behavior, including the content of synchronization information passed between the fail-over pair via the redundancy message channel that enable the standby partner to take over active status with minimal interruption to subscriber/clients to the data provided by the redundancy-enabled host.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

The following description is based on embodiments of the invention and should not be taken as limiting the invention with regard to alternative embodiments that are not explicitly described herein. By way of example, the present invention is incorporated within a supervisory process control and manufacturing information environment wherein individual data sources are represented by application objects. An example of such system is described in detail in Resnick et al., U.S. application Ser. No. 10/179,668 filed on Jun. 24, 2002, for SUPERVISORY PROCESS CONTROL AND MANUFACTURING INFORMATION SYSTEM APPLICATION HAVING A LAYERED ARCHITECTURE, the contents of which are incorporated herein by reference in their entirety including the contents and teachings of any references identified/contained therein. However, as those skilled in the art will appreciate in view of the disclosed exemplary embodiments, the present invention is potentially applicable to a variety of alternative supervisory process control environments that include identifiable data sources that provide real-time process data that drives a set of dynamic graphical elements representing at least a portion of an observed/controlled industrial process.

Figure 1:
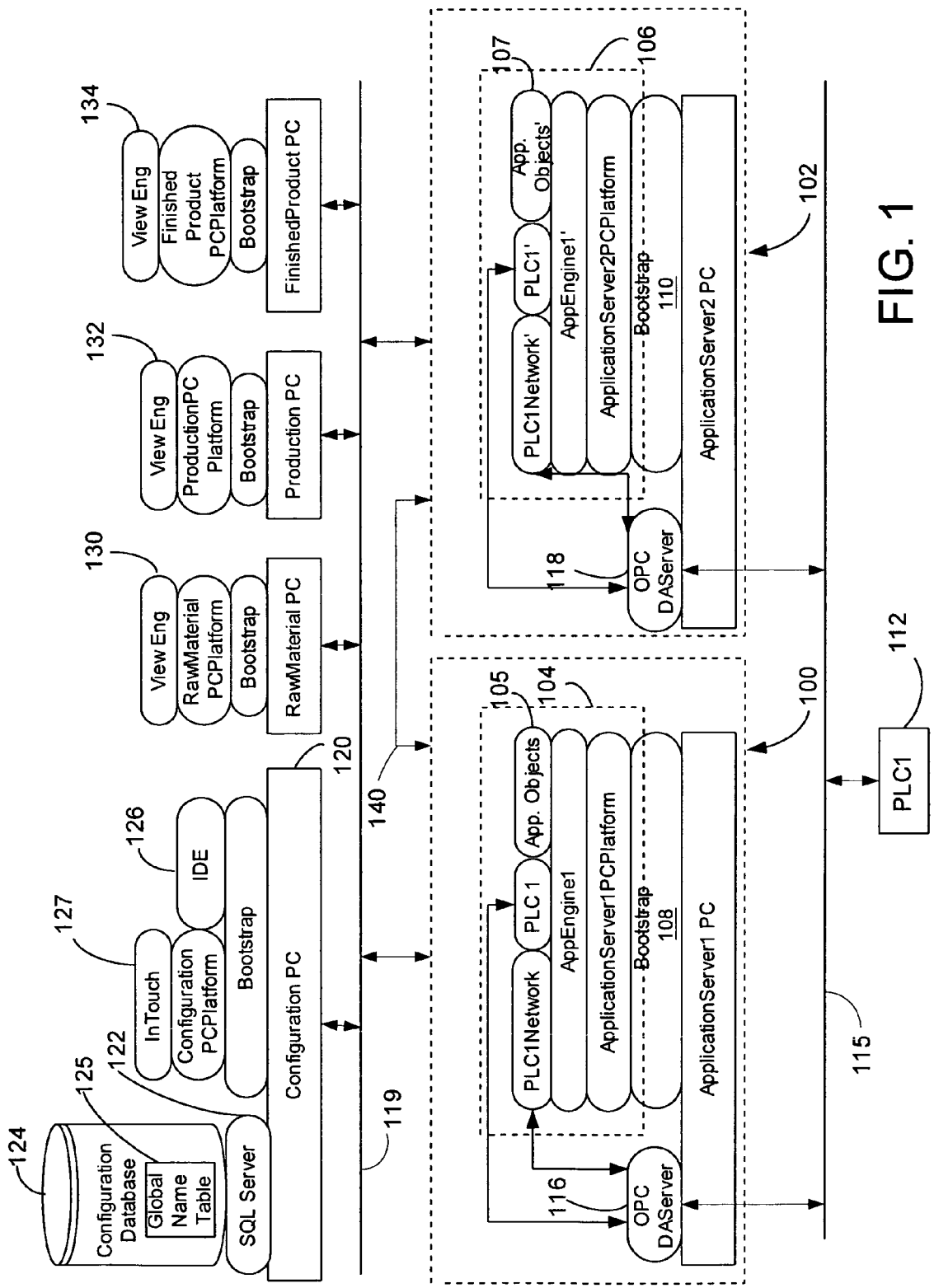
FIG. 1 is a schematic diagram depicting the hosting/hierarchical relationships of components within an exemplary supervisory process control network including a multi-layered supervisory process control and manufacturing information system.

Referring to FIG. 1, a schematic diagram depicts the hosting/hierarchical relationships of components within an exemplary supervisory process control network including a multi-layered supervisory process control and manufacturing information system that incorporates fail-over engine pairs. Before going into a more detailed description of the exemplary network environment it is generally noted that, in this embodiment, data sources are presented, by way of example, in the form of application objects 105 and application objects' 107 that receive status information. Furthermore, the application objects 105 and application objects' 107 are identified within a global name table 125 maintained by a configuration database 124 (e.g., Wonderware's Galaxy Repository)—the contents of which are made available to a developer via a visualization application development tool 127 (e.g., Wonderware's INTOUCH software) executing on a configuration PC 120. The visualization application development tool 127, in an embodiment of the present invention, submits queries for particular information residing within the configuration database to facilitate presenting available data sources (e.g., application objects 105) incorporated by a developer into one or more process visualization view/windows for a particular application (e.g., a manufacturing process line). Once built, the process visualization application is potentially executed upon any one of a set of workstations connected to the supervisory process control network schematically depicted in FIG. 1.

With continued reference to FIG. 1, a first application server personal computer (PC) 100 and a second application server PC 102 collectively and cooperatively execute a redundant distributed multi-layered supervisory process control and manufacturing information application comprising a first portion 104 and second portion 106. The application portions 104 and 106 include device integration application objects PLC1Network and PLC1, and PLC1Network' and PLC1', respectively. The PLCxNetwork device integration objects facilitate configuration of a data access server (e.g., OPC DAServers 116 and 118). The PLC1 and PLC1' device integration objects, operating as OPC clients, access data locations within the buffers of the OPC DAServers 116 and 118. The data access servers 116 and 118 and the device integration objects cooperatively import and buffer data from external process control components such as PLCs or other field devices.

In an embodiment of the invention, the requests are submitted by human machine interface software executing upon PCs (e.g., PC 120) connected to network 119 for plant floor information that drives graphical displays representing the plant floor equipment status. The data buffers of the data access servers 116 and 118 are accessed by a variety of application objects 105 and 107 executing upon the personal computers 100 and 102. Examples of application objects include, by way of example, discrete devices, analog devices, field references, etc. In the illustrative example, requests for plant floor information and responsive data are passed between the PCs 100 and 102 (on the plant floor) and PC 120 via the network 119.

In accordance with an embodiment of the present invention, application engines host the application objects (via a logical grouping object referred to herein as an "area"). The engines are in turn hosted by platform objects at the next lower level of the supervisory process control and manufacturing information application. The application portions 104 and 106 are, in turn hosted by generic bootstrap components 108 and 110. All of the aforementioned components are described herein below with reference to FIG. 2.

In the exemplary system embodying the present invention, the multi-layered application comprising portions 104 and 106 is communicatively linked to a controlled process. In particular, the first application server personal computer 100 and the second application server personal computer 102 are communicatively coupled to a first programmable logic controller 112 via a plant floor network 115. It is noted that the depicted connections from the PCs 100 and 102 to the PLC 112 via plant floor network 115 represent logical connections. Such logical connections correspond to both direct and indirect physical communication links. For example, in a particular embodiment, the PLC 112 comprises a node on an Ethernet LAN to which the personal computers 100 and 102 are also connected. In other embodiments, the PLC 112 is linked directly to physical communication ports on the PCs 100 and 102.

In the illustrative embodiment set forth in FIG. 1, the PCs 100 and 102 execute data access servers 116 and 118 respectively. The data access servers 116 and 118 obtain/extract process information provided by the PLC 112 and provide the process information to application objects (e.g., PLC1Network, PLC1, PLC1Network', PLC1') of the application comprising portions 104 and 106. The data access servers 116 and 118 are, by way of example, OPC Servers. However, those skilled in the art will readily appreciate the wide variety of custom and standardized data formats/protocols that are potentially carried out by the data access servers 116 and 118. Furthermore, the exemplary application objects, through connections to the data access servers 116 and 118, represent a PLC network and the operation of the PLC itself. However, the application objects comprise a virtually limitless spectrum of classes of executable objects that perform desired supervisory control and data acquisition/integration functions in the context of the supervisory process control and manufacturing information application.

The supervisory process control and management information application is augmented, for example, by the configuration personal computer 120 that executes a database (e.g., SQL) server 122 that maintains a supervisory process control and management information application configuration database 124 for the application objects and other related information including templates from which the application objects are instantiated. The configuration database 124 also includes a global name table 125 that facilitates binding location independent object names to location-derived handles facilitating routing messages between objects within the system depicted in FIG. 1. The configuration PC 120 and associated database server 122 support: administrative monitoring for a multi-user environment, revision history management, centralized license management, centralized object deployment including deployment and installation of new objects and their associated software, maintenance of the global name table 125, and importing/exporting object templates and instances.

Configuration of the applications, including the creation and deployment of fail-over application engines (discussed further herein below), is carried out via an Integrated Development Environment (IDE) 126. The IDE 126 is a utility (comprising potentially multiple components) from which process control and manufacturing information applications, including application objects and engines, are defined, created and deployed to a variety of platforms/engines including, for example, the application server PCs 100 and 102. Developers of a supervisory process control and manufacturing information application, through the IDE 126, carry out a wide variety of application design functions including: importing new object and template types, configuring new templates from existing templates, defining new application objects, and deploying the application objects to the host application engines (e.g., AppEngine1 on the application server PC 100).

The exemplary supervisory control network environment depicted in FIG. 1 also includes a set of operator stations 130, 132, and 134, connected to network 119, that provide a view into a process or portion thereof, monitored/controlled by the supervisory process control and management information application installed and executing as a set of layered objects upon the PCs 100 and 102. A RawMaterial PC 130 provides a representative view enabling monitoring a raw materials area of a supervised industrial process. A ProductionPC 132 presents a representative view of a production portion of the supervised industrial process. A FinishedProductPC 134 provides a representative view of an area of a production facility associated with finished product. Each one of the operator stations 130, 132, and 134 includes a bootstrap host for each of the particular operator station platforms. Each one of the operator stations 130, 132, and 134 includes a view engine that processes graphics information to render a graphical depiction of the observed industrial process or portion thereof.

In an embodiment of the present invention, PC 102 provides fail-over support for PC 100. By way of example, fail-over support occurs at the application engine level (e.g., AppEngine 1 and AppEngine 1'). Thus, when AppEngine 1 on PC 100 fails/shuts down, AppEngine 1' (having a same assigned reference name as AppEngine 1 in the global name table 125) on PC 102 is configured to take over responsibilities (e.g., hosting application objects) previously assigned to AppEngine 1. Fail-over support on the application engine level provides high availability for application objects, hosted by a fail-over enabled engine pair configuration across a runtime failure of a currently active engine of the fail-over engine pair. An application engine, in an embodiment of the invention, is enabled/designated for fail-over during a configuration stage. During configuration, only a primary engine is configurable (e.g., application objects are assigned to the primary engine). After a fail-over enabled application engine is checked-in, primary and backup application engines of an application engine fail-over pair are deployed to a first platform and second platform (residing on distinct networked machines). In a runtime environment, the primary engine is generally assigned an active role of the fail-over enabled application engine pair and therefore starts up/hosts/executes a set of hosted application objects.

On the other hand, an application engine assigned a backup role during configuration/deployment provides redundancy support for the fail-over pair. The backup engine, generally assigned a standby role of a fail-over enabled engine pair at runtime, ensures a high degree of availability of at least one engine of the application engine pair and hosted application objects. The backup engine is created when a fail-over configured application engine is checked in. The backup engine, and its analogous standby engine at runtime, contains the necessary components (e.g., software and data) for creating/hosting application object instances that are associated with the fail-over enabled application engine. However, in an embodiment of the invention, the application objects are neither started up nor executed on the backup engine of the fail-over engine pair. During runtime the standby engine of a fail-over enabled application engine monitors the status of the primary engine and checkpoints critical data in contemplation of taking over executing the application objects hosted by the fail-over enabled application engine pair in the event that the active engine ceases to operate. Upon detection of a failure of the current active application engine, the standby engine (e.g., AppEngine 1' on PC 102) becomes the active engine and performs the tasks associated with hosting the application objects on the fail-over enabled application engine pair. In particular, upon taking on the active engine role, the now active engine invokes startup methods on the hosted application objects and commences execution of the application objects in place of the failed partner of the fail-over enabled application engine pair. By way of example, when the standby engine acquires the role of active engine, it takes over responsibility for references that facilitate modifying attributes, monitoring changes to attributes, and retrieving data from an attribute. Such references are associated with supervisory, user and system reference sets associated with the hosted application objects.

An aspect of the fail-over enabled application engine pair disclosed herein is the relative transparency of the backup engine and the standby engine. In an embodiment of the invention, a user designates a host for a backup engine. However, deploying a backup engine is performed automatically, without intervention by a user. A user generally implements control/configuration of the fail-over enable application engine through operations on the primary/active engine. Furthermore, the active and standby engines share a single global name within a supervisory control system runtime environment. Thus, in the event of fail-over to the standby application engine, there is no need to change any references used to identify the fail-over enabled application engine pair. Though access to hosted application objects may be temporarily lost during fail-over (while the standby engine acquires the active role and starts up hosted application objects/primitives), clients are unaware of the switch to the standby (now active) application engine and continue using a same set of global references to access the resources supported by the fail-over enabled engine pair—though the physical location of the responsive application objects has changed.

In accordance with an embodiment of the present invention, the fail-over enabled application engine pair perform synchronization operations to facilitate a change in role of the standby engine to active engine status. Examples of synchronized data include: checkpoint files (including configuration/tuning values, alarm limits, and deployed objects on the active engine), alarm states (time stamped), subscriber lists (to data provided by hosted objects), live data, and data within a store and forward buffer (to be passed, for example, to a process status history database). Once initially loaded, the active engine tracks changes to synchronized information (e.g., checkpoint deltas) and sends only the changes (as opposed to passing complete copies of the synchronized information). Sending only changes significantly reduces the volume of traffic over a link 140 (described further herein below). This is especially important since embodiments of the invention contemplate a single PC (e.g., PC 102) hosting multiple instances of either active or standby engines. In the case where multiple application engines are configured as fail-over pairs on two PCs (e.g., PC 100 and PC 102), the link 140 is shared by all the fail-over engines to carry out communications relating to their fail-over functionality.

By way of example, checkpoint data is passed from the PC 100 (running the primary engine) and PC 102 (containing the backup engine) via the link 140 referred to herein as a redundancy message channel (RMC). The link 140 (e.g., an Ethernet link, an 802.11× wireless link, etc.) is physically separate and distinct from the plant floor network 115 and supports transferring essential information between PC 100 and PC 102 at high data rates to implement a fail-over/backup functionality. In an embodiment of the invention, a fail-over enabled engine (e.g., AppEngine 1 on PC 100) includes a system attribute (remote partner address or "RPA") that facilitates specifying an Internet Protocol address of a network interface associated with the backup engine side of link 140. On startup the primary engine (e.g., AppEngine 1) utilizes the RPA attribute to send a message to a specified host name or IP address to initially contact the platform that hosts its fail-over engine partner (e.g., AppEngine 1') via the Redundancy Message Channel (RMC)—represented in FIG. 1 by link 140. This initial message informs the backup/standby engine (or any other interested entity including the platform host for the backup/standby engine) of the IP address of the primary engine's host platform. In an embodiment of the invention, the RPA is calculated after a node/platform for the backup engine is specified. Thus, the RPA is potentially designated during a configuration stage or during a deployment stage where the fail-over enabled configuration is loaded onto specified platforms on a network. In an exemplary embodiment, a single RPA is assigned to a physical network interface for a platform (PC) that potentially hosts multiple application engines. However, distinct references (e.g., handles, names, etc.) are assigned to each fail-over application engine to distinguish multiple application engines hosted by a single platform.

It is noted that the system depicted in FIG. 1 and described hereinabove is merely an example of a multi-layered hierarchical architecture for a supervisory process control and manufacturing information system including redundant/fail-over application servers for ensuring the continuous supply of data from a plant floor network 115 to human machine interface computers on the network 119. The present invention is not limited to the particular disclosed application/system, and in fact, need not be implemented in the form of a multi-leveled application as shown in the illustrative example. It is further noted that FIG. 1 is presented as a logical view of the hosting and/or containment interrelations between installed components including software and physical computing hardware. The present invention is suitable for virtually any network topology. For example, the present invention is applicable to a system wherein both configuration utility and supervisory process control visualization applications run on a single computer system linked to a controlled process.

Figure 2:
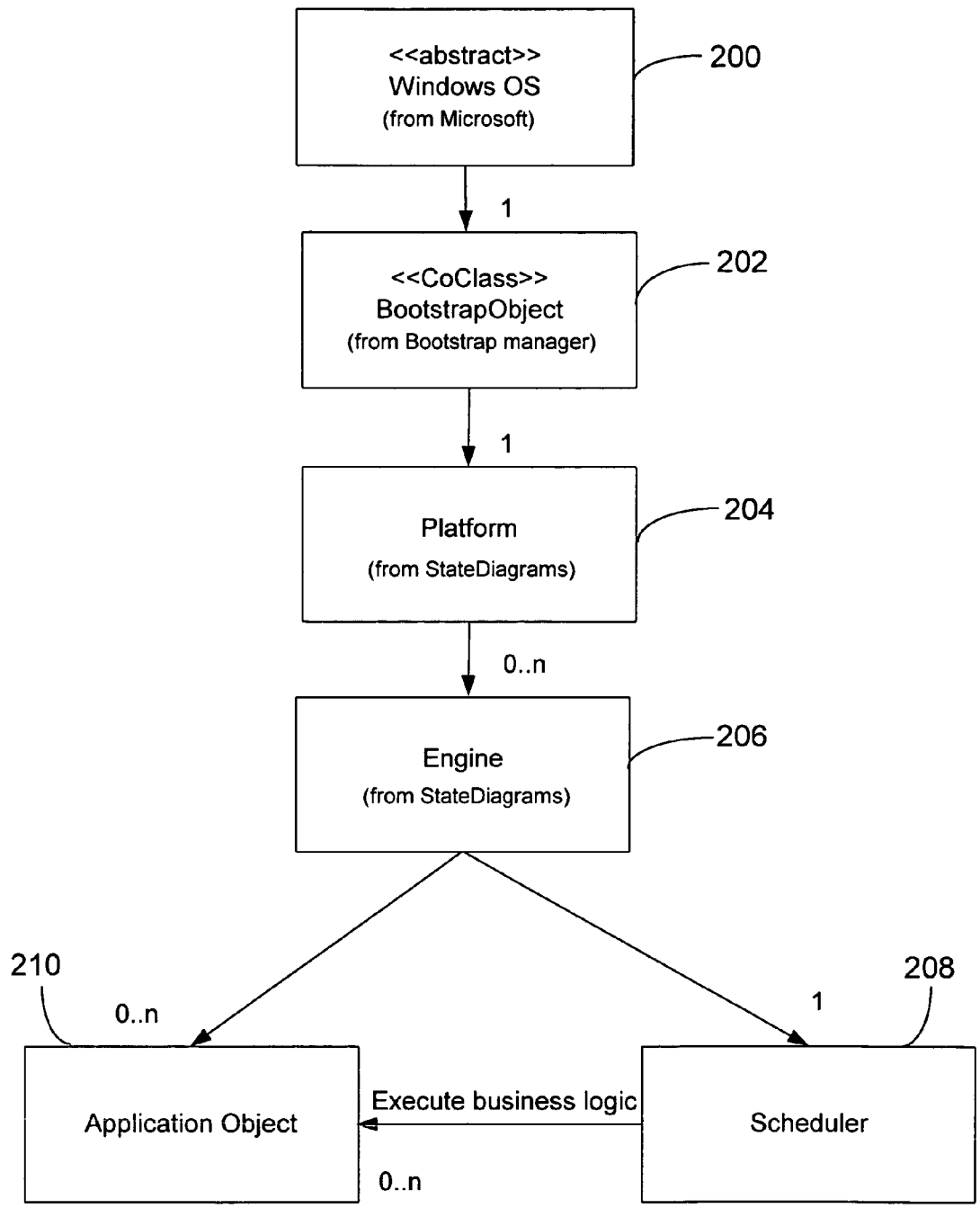
FIG. 2 depicts a multi-tiered object hosting arrangement for hosting applications on platforms and engines within an exemplary system embodying the present invention.

Turning to FIG. 2, a class diagram depicts the hierarchical hosting arrangement of layered software associated with a computer (e.g., PCs 100 or 102) executing at least a portion of a supervisory process control and manufacturing information application. Each computer executes an operating system 200, such as MICROSOFT's WINDOWS at a lowest level of the hierarchy. The operating system 200, hosts a bootstrap object 202. The bootstrap object 202 is loaded onto a computer and activated in association with startup procedures executed by the operating system 200. As the host of a platform class object 204, the bootstrap object 202 must be activated before initiating operation of the platform class object 204. The bootstrap object 202 starts and stops the platform class object 204. The bootstrap object 202 also renders services utilized by the platform class object 204 to start and stop one or more engine objects 206 hosted by the platform class object 204.

The platform class object 204 is host to one or more engine objects 206. In an embodiment of the invention, the platform class object 204 represents, to the one or more engine objects 206, a computer executing a particular operating system. The platform class object 204 maintains a list of the engine objects 206 deployed on the platform class object 204, starts and stops the engine objects 206, and restarts the engine objects 206 if they crash. The platform class object 204 monitors the running state of the engine objects 206 and publishes the state information to clients. The platform class object 204 includes a system management console diagnostic utility that enables performing diagnostic and administrative tasks on the computer system executing the platform class object 204. The platform class object 204 also provides alarms to a distributed alarm subsystem.

The engine objects 206 host a set of application objects 210 that implement supervisory process control and/or manufacturing information acquisition functions associated with an application. The engine objects 206 initiate startup of all application objects 210. The engine objects 206 also schedule execution of the application objects 210 with regard to one another with the help of a scheduler object 208. Engine objects 206 register application objects 210 with the scheduler object 208 for execution. The scheduler object 208 executes application objects relative to other application objects based upon a configuration specified by a corresponding one of the engine objects 206. The engine objects 206 monitor the operation of the application objects 210 and place malfunctioning ones in a quarantined state. The engine objects 206 support check pointing by saving/restoring changes to a runtime application made by automation objects to a configuration file. The engine objects 206 maintain a name binding service that binds attribute references (e.g., tank1.value.pv) to a proper one of the application objects 210.

The engine objects 206 ultimately control how execution of associated ones of the application objects 210 will occur. However, once the engine objects 206 determine execution scheduling for application objects 210, the real-time scheduling of their execution is controlled by the scheduler 208. The scheduler 208 supports an interface containing the methods RegisterAutomationObject( ) and UnregisterAutomationObject( ) enabling engine objects 206 to add/remove particular ones of the application objects to/from the scheduler 208's list of scheduled operations.

The application objects 210 include a wide variety of objects that execute business logic facilitating carrying out a particular process control operation (e.g., turning a pump on, actuating a valve), and/or information gathering/management function (e.g., raising an alarm based upon a received field device output signal value) in the context of, for example, an industrial process control system. Examples of process control (automation) application objects include analog input, discrete device, and PID loop objects. A class of the application objects 210, act upon data supplied by process control systems, such as PLCs, via device integration objects (e.g., OPC DAServer 118). The function of the integration objects is to provide a bridge between process control/manufacturing information sources and the supervisory process control and manufacturing information application.

The application objects 210, in an exemplary embodiment, include an application interface accessed by the engine objects 206 and the scheduler 208. The engine objects 206 access the application object interface to initialize an application object, startup an application object, and shutdown an application object. The scheduler 208 uses the application object interface to initiate a scheduled execution of a corresponding application object.

Figure 3:
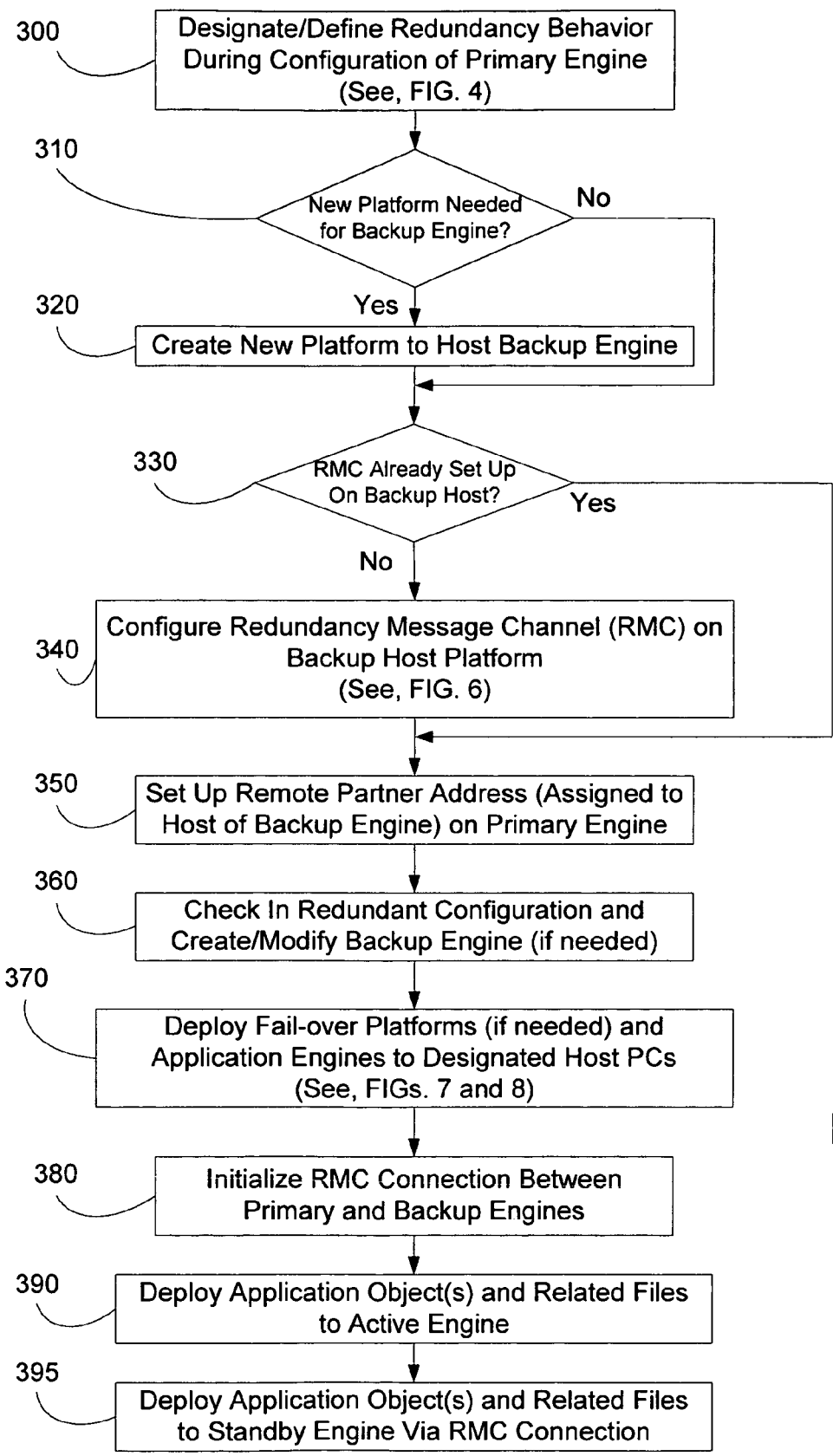
FIG. 3 is a flowchart summarizing a set of exemplary steps for configuring and deploying a redundant host, and more particularly an application engine that hosts a set of application objects.

Having described the primary components of an exemplary supervisory process control and manufacturing information network environment, attention is directed to an exemplary set of steps summarized in FIG. 3 that are interactively performed, in part, via a supervisory process and manufacturing information system component configuration utility such as the previously mentioned IDE 126. In the illustrative example, the configuration utility comprises a graphical user interface that exposes a set of parameters associated with defining and deploying a redundant/fail-over enabled host, and in particular a fail-over enabled application engine pair. The parameter values specified by a user through the interface are utilized during later deployment (or redeployment) of the fail-over host/application engine pair. It is noted that while the illustrative example is directed to an application engine, the present invention is potentially applicable to a variety of host objects, and seeks to provide a streamlined and user-friendly way of configuring redundancy in a system and ensure backup availability of host components in a supervisory process control and manufacturing information system. Furthermore, the ordering of the steps is intended to be exemplary. Those skilled in the art will readily appreciate the ability to modify the order of completing various stages described herein below in accordance with alternative embodiments of the invention.

Step 300: Enabling Fail-over for an Application Engine During Configuration

Figure 4:
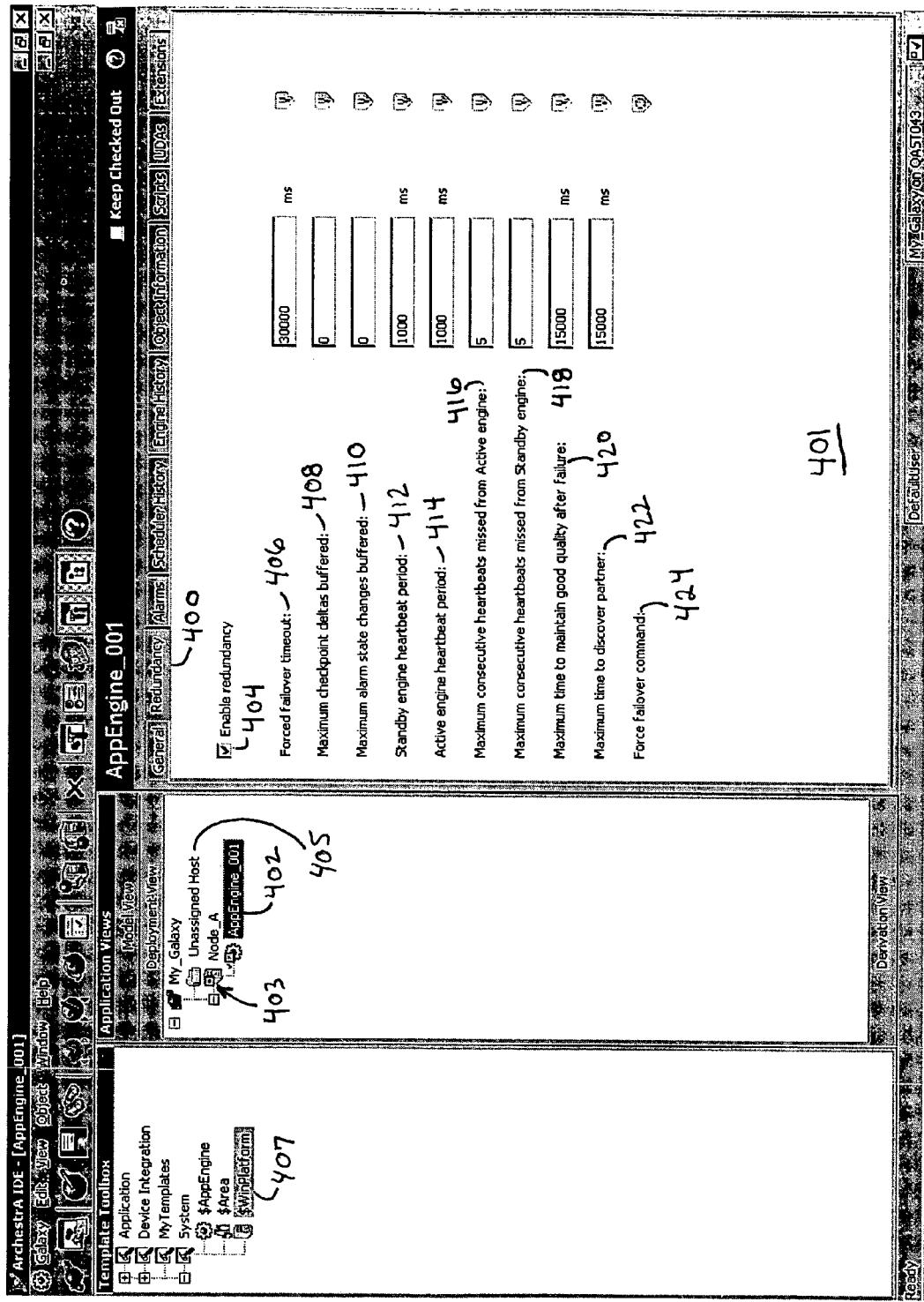
FIG. 4 is an exemplary user interface associated with configuring a redundancy capable host/application engine.

Initially, during step 300 a user enables and customizes fail-over behavior for a selected application engine object. The selections/values designated for the application engine during step 300 are registered by the configuration utility (e.g., IDE 126) for later use when the application engine configuration selections are checked in and deployed. Referring to FIG. 4, application engine fail-over behavior is enabled and customized, by way of example, through a set of values submitted by a user via a redundancy properties interface generated by the configuration utility.

In the illustrative example, the configuration utility user interface presents a number of tabs relating to configuration of the application engine 402 (selected in the deployment view area of the configuration user interface of FIG. 4). A user selects a Redundancy tab 400 on the configuration utility interface to expose a set of parameters, depicted in a properties view 401, associated with defining redundancy/fail-over behavior for a currently selected application engine (AppEngine_001) 402. In an embodiment of the invention, a user designates redundancy for the selected application engine 402 by "checking" an Enable redundancy checkbox 404. In response to the fail-over designation, a fail-over dynamic primitive is added to the application engine object and the engine is designated as the primary engine of a fail-over pair. While not shown in FIG. 4, the backup engine for application 402 is initially assigned in the deployment view to the unassigned host 405. A user thereafter re-assigns the backup engine (via drag and drop) to an actual platform node depicted in the deployment view. After the configuration of the application engine 402 is saved/checked in (releasing an editing lock on the object) during step 360 (described herein below) and validated by calling a validate method on the object, a backup engine object is created by a utility that manages objects within the system.

The illustrative fail-over configuration interface set forth in FIG. 4 also supports a set of user-specified parameters defining the fail-over behavior of the application engine 402. A forced fail-over timeout 406 enables a user to designate a period of time that a currently active application engine is given to execute a user-initiated fail-over to a standby application engine that otherwise waits in a standby state. A maximum checkpoint deltas buffered 408 enables a user to specify a maximum number of checkpoint delta packages that will be buffered before initiating a full re-synchronization of the checkpointed information. A typical value for the maximum checkpoint deltas 408 is zero (when there is plenty of bandwidth to transfer the checkpoint delta packages to the standby engine during a scan cycle), and is used to handle exceptional cases such as a slow synchronization link. A maximum alarm state changes buffered 410 enables a user to specify the maximum number of alarm state change packages that will be buffered before the active application engine will initiate a complete re-synchronization of the alarm states.

The redundancy/fail-over parameters exposed by the exemplary configuration user interface include a set of parameters relating to heartbeats transmitted/broadcast by the active and standby application engines to other system components. The heartbeats are periodic transmissions, to which recipients need not respond, that provide assurance that the heartbeat sender is operational. A standby engine heartbeat period 412 and an active engine heartbeat period 414 specify periods between transmissions of heartbeat messages by each of the two engine role types. A maximum consecutive heartbeats missed from active engine 416 and a maximum consecutive heartbeats missed from standby engine 418 specify a number of consecutive elapsed heartbeat periods that are registered by a listener (i.e., intended recipient of the heartbeat transmissions) before registering a fail-over pair communication failure. Such failures are potentially handled by supervisory scripts that perform any one of a variety of operations including, by way of example, generating a warning/alarm message to a monitor, initiating fail-over to a standby partner engine, and re-deploying (automatically or upon direction from a user) the non-responding fail-over engine partner. The use of heartbeats in a fail-over scheme is discussed further herein below.

Transferring responsibilities from an active engine to a standby engine does not commence until the standby engine has become active. If the time delay between when a client engine becomes aware of the primary/active engine's failure and when the client engine receives notification that the backup/standby has become active exceeds a configured limit, then the quality of all references associated with the failed engine are set to uncertain. The configured time delay limit is specified by a user via a maximum time to maintain good quality after failure parameter 420. Yet another parameter, a maximum time to discover partner 422, enables a user to specify how long the primary engine waits for a response from its backup engine, after issuing a connection request via the RMC, before registering a failure. A force fail-over command 424 enables a user to specify an alphanumeric string that, when provided by a supervisor/administrator, will force transfer of active status from the currently active engine to the current standby engine without waiting for the currently active engine to fail.

Steps 310 and 320: Configuration of a New Platform Host for the Backup Engine With continued reference to the illustrative example set forth in FIG. 4, the application engine 402 and its backup engine must be deployed to separate platforms/nodes. If, at step 310, a platform for hosting the backup of the application engine 402 (on the platform identified in the deployment view as "Node_A") does not yet exist, then control passes to step 320 wherein a platform is configured/created to host the backup engine for application engine 402. As indicated by a tree structure 403 (depicting a configured physical deployment view of application components in a system including multiple networked computing nodes), a second physical networked computing device node/platform object does not yet exist for hosting a backup application engine for the application engine 402 deployed to a platform object identified in the tree structure 403 as "Node_A". Therefore, during step 320 a user creates a new node/platform, by dragging and dropping a copy of a $WinPlatform template 407 from a template toolbar tree into the deploy view area.

Figure 5:
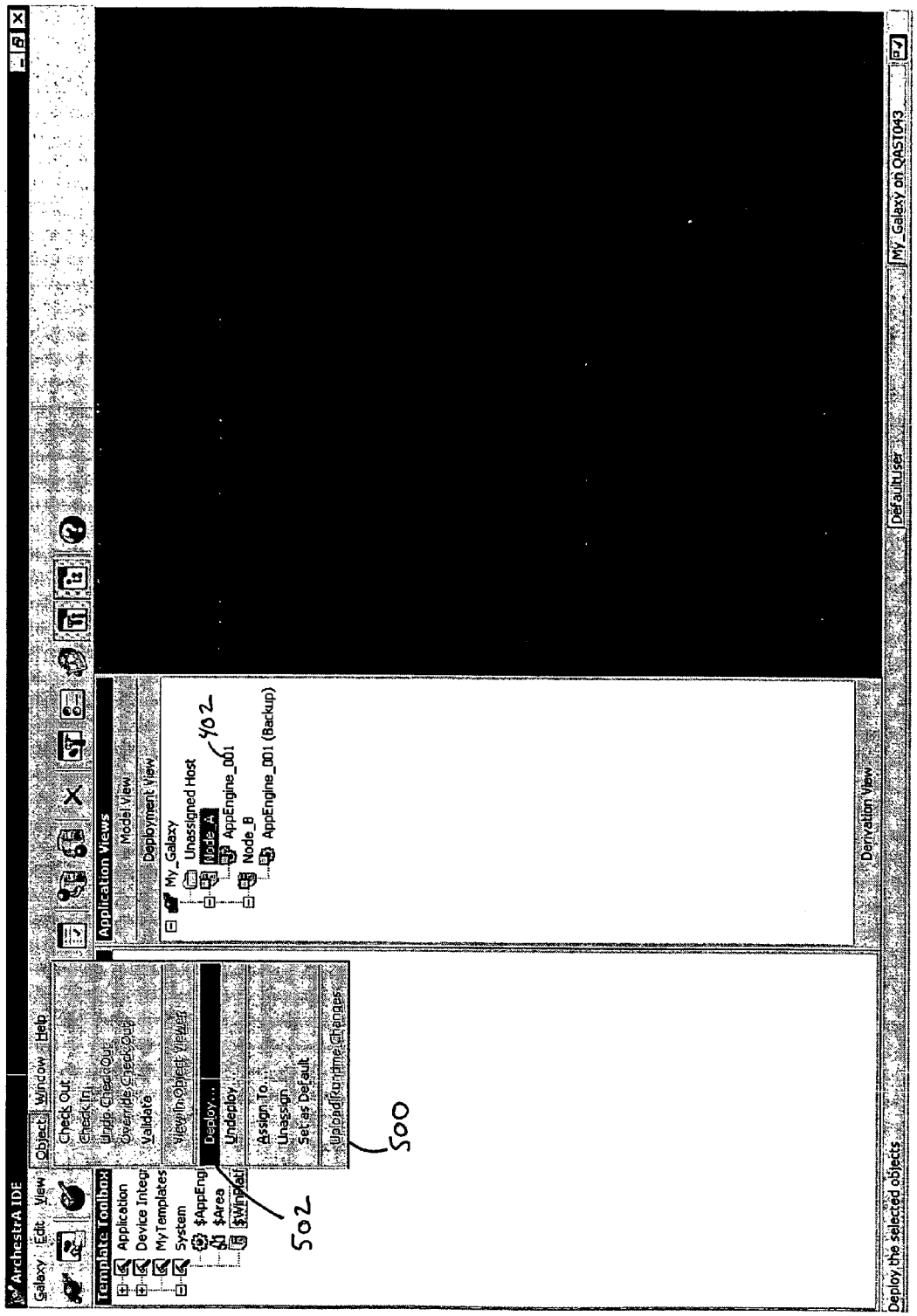
FIG. 5 is an exemplary user interface associated with deploying a node for hosting a backup application engine.

Turning briefly to FIG. 5, an exemplary deployment view depicts a redundant engine pair configuration after a user has created a new node/platform (Node_B) to host the backup engine for application engine 402 that resides on Node A. After creating Node_B, the backup for the application engine (AppEngine_001) 402 is placed upon Node_B by dragging and dropping "AppEngine_001 (Backup)" from the Unassigned Host directory to the Node_B platform on the depicted Deployment view tree. The Node B will, as depicted in FIG. 5, host the backup (AppEngine_001(Backup) for the application engine (AppEngine_001) 402 on Node A. Upon completing creating/configuring a new platform to host the backup application engine, control passes from step 320 to step 330.

On the other hand, if the host platform for the backup engine already exists, then control passes directly from step 310 to 330.

It is noted that creating application components (e.g., a node/platform, an engine, an application object, etc.) in the deployment view of a configuration environment is a distinct operation from "deploying" components to physical computing machines within a network. With continued reference to FIG. 5, an "Object" menu 500 includes a "deploy" option 502 for carrying out the actual deployment of one or more selected components from the deployment view. When the "deploy" option is selected in conjunction with a previously selected "Node_A", a platform, corresponding to Node_A in the deployment view, and all components under Node_A, are installed upon a networked computing machine corresponding to Node_A. Such deployment of application components is described further herein below.

Steps 330/340: Configuring the RMC on the Backup Platform

In addition to a backup engine host, a fail-over application engine pair also relies upon a fail-over communications link, and in particular a redundancy message channel (RMC). The RMC provides a communications path between host platforms of fail-over partners through which the primary and backup engines exchange information including, by way of example, checkpoint, status, and command/control information. Each host platform on the RMC is assigned a unique physical network address. In an illustrative exemplary embodiment, the RMC utilizes a network path between PCs that is physically separate from a primary general network path utilized by the host PCs for a variety of other purposes. By way of example, the RMC utilizes link 140 (e.g., an Ethernet link) that is physically separate from network 119. In an alternative embodiment, the primary general network (e.g., network 119) is utilized. However, using the general network 119 is less desirable in many instances due to the effect of the additional workload associated with the RMC on the performance of network 119.

The RMC is potentially used by multiple fail-over pairs for purposes of carrying out fail-over/redundant engine-related communications. In one example of using the RMC to handle multiple fail-over pairs, sharing of the link 140 is contemplated to facilitate an "N on 1" fail-over configuration wherein a single platform hosts the backup counterpart for a set of N primary application engines configured for fail-over. In fact, the primary application engines need not be present on the same host PC. Instead, a single platform (e.g., ApplicationServer2PCPlatform) potentially hosts backup engines for multiple primary engines with different host PCs. In such instance, the link 140, by way of example, comprises a multi-drop network bus and each platform hosting a primary or backup engine shares a common network (corresponding to link 140) for their RMC. Workload is balanced to ensure that, in the event of multiple fail-overs, activating multiple standby engines on a single platform does not cause scan overruns on the host of the standby engines when they assume the active engine role. Such contingent behavior is potentially handled by executing a supervisory script upon the platform hosting the fail-over backup engines to monitor workload and relocate backup engines to other available platforms. Relocating the backup engines in response to detected load avoids overloading a platform (computing device/node) that, as a consequence of multiple primary/active engine failures, is forced to support multiple active application engines.

Alternatively, in the case where multiple backups are hosted on a single platform host, multiple RMCs (and corresponding network adaptors having distinct network addresses) can be provided for the single platform host such that each fail-over pair is assigned a separate RMC. In yet other embodiments, a combination of dedicated and shared RMCs are supported by a single platform host.

Figure 6:
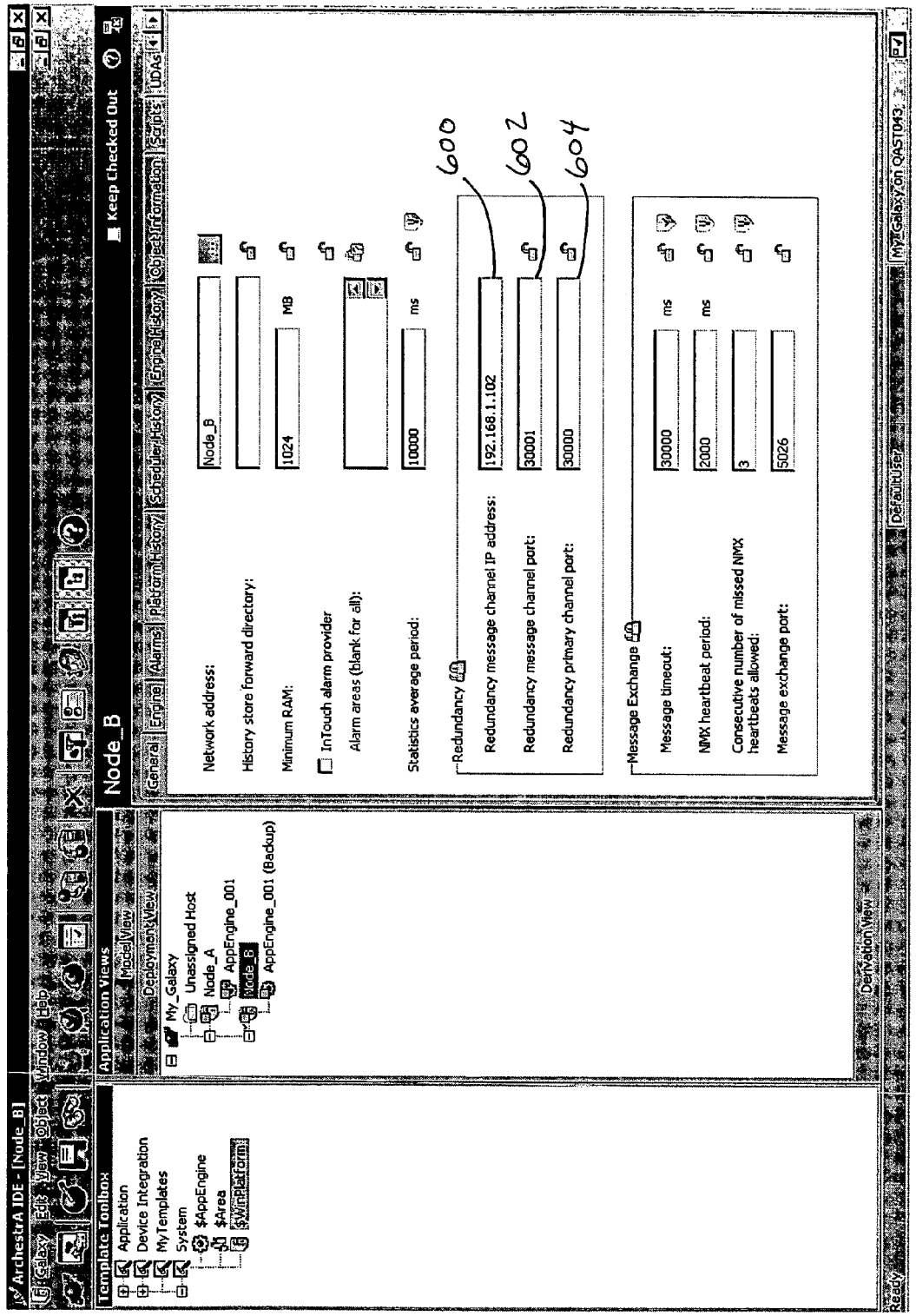
FIG. 6 is an exemplary user interface associated with configuring a redundancy message channel (IP address of the network interface card) on a node hosting a backup partner of a fail-over engine pair.

With continued reference to FIG. 3, during step 330 if an RMC has not yet been set up on the backup host (Node_B), then control passes to step 340. At step 340 the configuration utility presents a user interface that exposes a set of parameters enabling user to specify a network address corresponding to the backup engine's host platform (Node_B) on the RMC. Referring to FIG. 6, the configuration interface for a platform (e.g., Node_B) includes a set of "Redundancy" configuration fields for specifying the RMC channel. In particular, a redundancy message channel IP address 600 enables a user to specify a physical (IP) address (e.g., 192.168.001.102) corresponding to the network address/name assigned to the platform (e.g., Node_B) on the RMC link. The value in the redundancy message channel IP address 600 is the RPA for node A. Furthermore, the user specifies a redundancy message channel port 602 and a redundancy primary channel port 604. These are the ports for maintaining the heartbeats over the RMC and the primary channel. The RMC IP address 600 has been referred to previously above as the "Remote Partner Address" (RPA). The RPA is utilized by the host of the primary engine, after a fail-over enabled engine pair is checked in and deployed to appropriate platforms, to contact a corresponding backup engine host via the RMC.

In an embodiment of the invention, a message routing service on a platform resolves engine names to addresses. The message routing service executing on the host platform of an engine detects communications across the RMC directed to a corresponding fail-over partner engine and directs the communications to an appropriate engine. Furthermore, the message routing service's ability to distinguish between differing engines (through name resolution operations on their distinct names) on a same RMC facilitates N on 1 fail-over scenarios as well as transparently relocating a fail-over enabled engine to a new platform.

FIG. 6 includes a set of fields relating to general operations of the Node_B on a primary network (for communicating with a variety of other host nodes). A network address, which can be either a physical (e.g., IP) address or a name, corresponds to the address of Node_B on the primary network. A history store forward directory field specifies a location of store forward data on Node_B (for buffering data for transmission when the primary network is down or too slow to handle Node_B's data transmission flow.

FIG. 6 also includes a set of fields relating to a message exchange service carried out on a primary network to which Node_B is attached. A message timeout value identifies how long Node_B waits for a response before assuming a sent message is lost. An NMX heartbeat period allows for slow networks to avoid timing out when heartbeats are potentially lost/delayed due to a slow link. Consecutive missed heartbeats is a multiplier.

It is noted that a physical address was specified for the RMC of the backup engine host in the example set forth in FIG. 6. However, in an alternative embodiment of the invention, during step 340 a user specifies a host name corresponding to the physical IP address in the RMC IP address 600, and the name is thereafter resolved by a name service to a corresponding physical IP address. After setting up an address on the RMC for the backup engine host, control passes to step 350. On the other hand if, at step 330, an address on the RMC is already set up for the backup engine host (Node_B), then control passes to step 350.

Step 350 Setting RPA on Primary Engine

During step 350, the platform hosting the primary engine's (e.g., application engine 402) configuration is supplemented to include the address of the backup engine (of application engine 402) host platform on the RMC (the aforementioned RPA attribute). The RPA attribute facilitates the primary engine initiating a connection with its corresponding backup engine.

Step 360 Checking in Redundant Configuration

Thereafter, during step 360 the application engine, having redundancy enabled, is "checked in" on the configuration database 124. Checking in the application engine releases a locking mechanism that prevents others from changing a checked out application engine while it is, for example, being configured/edited. Checking in an application engine with redundancy enabled also triggers creation of a backup engine instance (assuming one does not currently exist for the particular application engine). Attributes are copied from the primary engine to the newly created engine instance, and a backup "role" attribute is assigned to the new engine instance. The backup role attribute distinguishes the backup engine from its primary engine partner during deployment of the engine partners to their respective platforms during step 370 described herein below. In an exemplary embodiment, the backup engine is initially assigned to a default platform, but can be reassigned via the IDE 126 to another platform. The backup engine is assigned to the same "area" (corresponding to a grouping of closely related components of a process control and manufacturing information system) as the primary engine.

A backup application engine, as a result of copying parameters specified for the primary engine, has the same configuration data as its partner primary engine. Therefore, if a backup engine already exists at the time the primary engine is checked in with redundancy enabled, then the system checks out the backup engine, copies updated configuration data (attributes) from the primary engine to the checked out backup engine, and checks in the modified backup engine. Thus, the backup engine has a copy of the primary engine's configured deployment package.

The configuration information in the backup engine is substantially the same as the primary engine. An exception to this general statement is the "remote partner attribute (RPA)" of the redundancy primitive. The distinct RPA attribute is specified first for the primary engine (during step 350) and later in the backup engine (during step 380) after both the primary and backup applications have been deployed to their respective platforms.

Though not a part of the steps set forth in FIG. 3, a backup engine that has not yet been deployed is deleted when its primary partner is checked in with the redundancy option (e.g., enable redundancy 404) disabled. The removal of the backup engine is broadcast to current clients having references to the redundancy-enabled primary application engine—since the clients potentially have current engine and platform identifications corresponding to the backup engine. In the deployment configuration view of the system, the application engine will no longer visually indicate that it is a primary partner of a fail-over pair. On the other hand, if an application engine is checked in with the redundancy option disabled, and it has a backup engine in a deployed state, then checking in the primary engine will fail. Therefore, prior to removing a backup engine, the backup engine must be undeployed.

Step 370 Deploying Configured Redundant Engines (and Hosts If Necessary)

With continued reference to FIG. 3, after the redundancy enabled application engine configuration is checked in, during step 370 a user invokes a deploy operation on the configured redundant application engine pair. By way of example, deployment of the redundant application engine configuration package is initiated when a user invokes a global deploy operation by selecting the deploy option on the "Object" menu after selecting a Galaxy containing the application engine (see, e.g., "MyGalaxy" in the deployment tree 700 of FIG. 7). Deploying the redundant application engine pair— marking a transition from a configuration environment to a runtime environment—includes copying files and information associated with the application engines (including platform files if necessary) to appropriate host machines.

Figure 7:
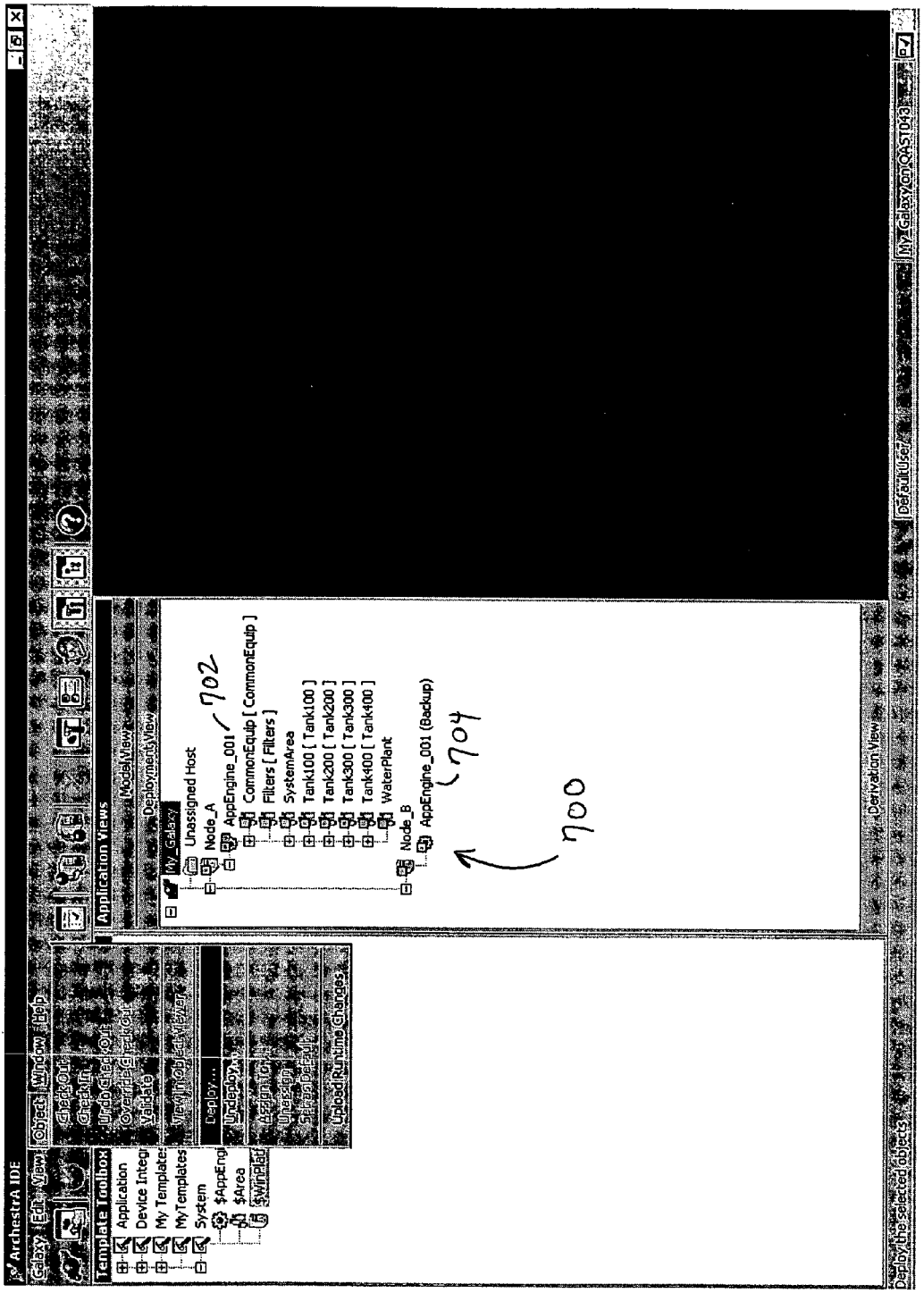
FIG. 7 is an exemplary user interface associated with deploying a configured fail-over engine pair.

The illustrative example of a fail-over architecture embodying the present invention utilizes a role-based approach to redundancy during configuration, deployment and runtime. Primary/backup roles are initially assigned to redundant application engines during configuration. Turning briefly to FIG. 7, the distinct roles of primary and backup engines are incorporated into a configuration/deployment view of an application engine with redundancy enabled. In particular, for an application engine that is configured to host a set of application objects, an application engine (ApEngine_001) 702 node (representing a primary application engine) enumerates a set of application objects as leaves under the application engine 702 node. In a runtime environment (described herein below) application objects are only executed upon an active application engine (the runtime analog of a primary engine in the configuration/deployment environment). The limited functionality/presence of application objects on a standby engine (the runtime analog of a backup engine in the configuration/deployment environment) is visually represented in FIG. 7 by not displaying application objects under an application engine Backup (ApEngine_001) 704 node in the configuration/deployment view.

Deploying the Fail-over Engine Pair

Figure 8:
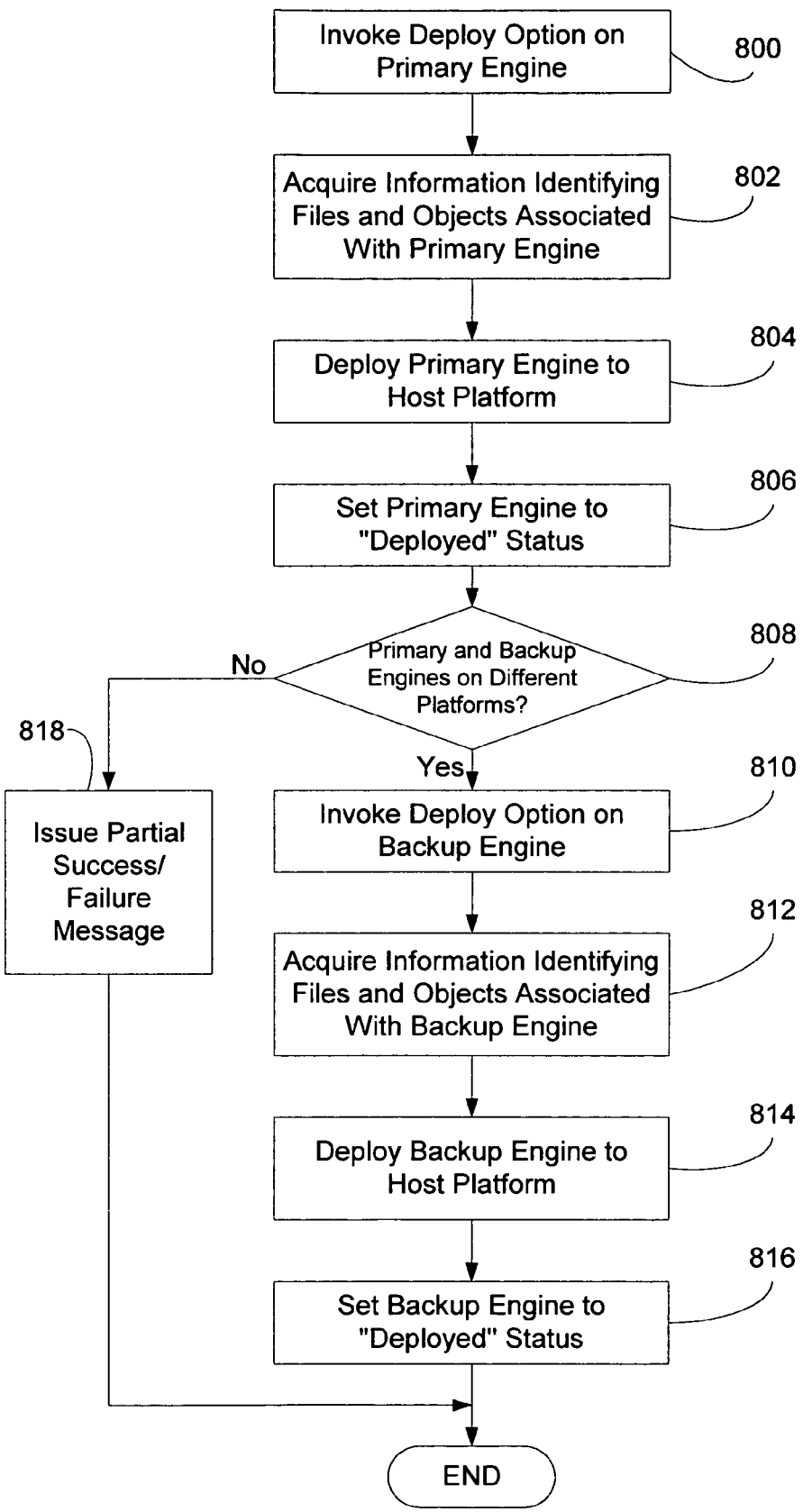
FIG. 8 is a flowchart including an exemplary set of steps summarize deploying a fail-over enabled engine pair to their respective hosts.

Turning to FIG. 8, a set of steps summarize deploying a fail-over enabled application engine pair to their respective hosts during step 370. In the exemplary embodiment, the primary and backup roles established during configuration determine an order of operations when the redundant application engines are deployed to their respective platforms during step 370. When a user requests deploying a primary and backup engine, the system ensures a primary engine is fully deployed prior to deploying its associated backup engine. This also ensures that the primary engine will assume the role of active engine and the backup engine will initially detect the presence of an operational active application engine and acquire the standby role.

In a particular embodiment of the present invention, during step 800 a deployment server initially invokes a deploy command specifying a deployment package associated with the primary application engine. In response, during step 802 information is acquired identifying the platform, files, node name and application objects associated with the primary engine. The primary engine object itself and files and information utilized by the primary engine object are thereafter transferred during step 804 to (if not already present upon) a node containing the platform that hosts the primary engine. During step 804, the primary engine object is created and launched on the node. Upon completing step 804, the primary engine's status is set to "Deployed" during step 806. At this point none of the application objects hosted by the primary engine have been deployed to the primary engine. Instead, deploying the application objects is performed in a runtime environment wherein one of the fail-over enabled application engine pair has acquired "active" runtime status.

In the exemplary embodiment, deployment is carried out sequentially by initially deploying the primary engine and then deploying the backup engine of a fail-over application engine pair. The primary and backup application engines should be deployed to distinct platforms. In the exemplary embodiment, after successfully deploying the primary engine and before deploying the backup engine, at step 808 the platforms specified for hosting the primary and backup engines are compared. If different platforms are specified, then control passes to step 810 wherein the deployment server invokes a deploy command specifying a deployment package associated with the backup application engine. Thereafter, steps 812 and 814—that correspond to steps 802 and 804 described herein above—are carried out with regard to the backup application engine. Thereafter, at step 816 the backup engine configuration status is set to "Deployed" status. The backup application engine, like the primary application engine, does not host any application object at the time of completing step 816. Control then passes to the End.

On the other hand, if at step 808 the same platform is specified to host the primary and backup engines of a redundant pair (the equivalent of a same networked machine since a single platform is present on any machine), then control passes to step 818 wherein deploying the backup application engine is bypassed, and a partial success/failure to deploy the redundant fail-over engine configuration is registered/reported. Control then passes to the End.

Un-deploying a fail-over pair is facilitated by an "un-deploy" command (see "undeploy" option under the Object menu in FIG. 7) supported by the IDE 126. The fail-over pair can be un-deployed by individual selection of each engine or simultaneously using the "un-deploy both" option in an Un-deploy dialog. When the "un-deploy both" option is selected, the standby engine is un-deployed first and then the active engine. When a hardware failure occurs causing a fail-over, a user typically un-deploys the fail-over enabled engines from a failed node and re-deploys the engines on a new node. The user marks the engines as un-deployed to relocate the engines to a new host platform. Marking an engine as un-deployed on failure applies to either engine in a fail-over pair.

Step 380 Establishing A Connection Between Primary and Backup Engines Via RMC Returning to FIG. 3, after completing the deploying step 370 the application engines exist on their respective platforms in a runtime environment wherein the active and standby engines of a fail-over pair communicate with each other and monitor each other's status through an RMC. Therefore, during step 380 the primary application engine issues a request to connect to its fail-over backup engine. In an embodiment of the invention, the connection request is issued via the RMC and includes the remote partner address (RPA), corresponding to the host platform of the backup engine, in the destination field (configured on the primary engine during step 350). The source field identifies the physical address of the platform that hosts the primary engine. The initial connection request serves to inform the backup engine (or host platform of the backup engine) of the physical address for its primary engine on the RMC, and the backup engine updates its RPA attribute based upon the address specified in the source field of the connection request.

Step 390 Deploying Application Objects and Related Files to Active Engine

The distinct/differing roles assigned to particular engines of a fail-over application engine pair are incorporated into a runtime environment (described herein below with reference to FIG. 9) wherein one engine of each fail-over application engine pair is assigned/acquires a role of "active engine" and the other engine is assigned/acquires a role of "standby engine". The active engine of a fail-over pair can be either the primary or backup engine of a fail-over engine configuration. However, only one of the two application engines can be the active engine at any time.

The current runtime role (e.g., active or standby) of an application engine determines the manner in which application objects and related components (e.g., files) are provided to a platform hosting an instance of an application engine of a fail-over engine pair. During step 390—a step that can occur at any point after the primary application engine is operational (even before step 380 wherein the RMC is established)—application objects and related components are deployed from a configuration database/file repository to the active engine of a fail-over enabled pair via a primary network (e.g., network 119 in FIG. 1).

The following summarizes an exemplary sequence of steps for deploying an application object and associated/required components to a particular active application engine deployed from a fail-over enabled application engine configuration. In response to an instruction/command to deploy a specified application object to a fail-over enabled application engine pair, the status (e.g., active or standby) of both the primary and backup application engines is determined. Thereafter, a node name (or address) for a node where an active application engine (of a deployed primary and backup engine pair) resides is obtained. Next, further information is acquired relating to the node, platform, and active application engine. Furthermore, information is acquired for the specified application object and any components (e.g., files) required by the application object (that are to be deployed with the application object) on the node containing the active application engine that will host the deployed application object. Thereafter, components identified as needed to support instantiating and executing the application object on the active application engine are deployed to the node.

In a particular embodiment, deploying required components for instantiating and executing an application object on a particular active application engine is optimized to identify components (e.g., files) that are already on a target platform that hosts the active application engine. Only components that do not already exist on the target platform are transferred during step 390. Furthermore, if a particular application object is already deployed on the target host engine, then components previously loaded on the node associated with the application object (and not in use by other application objects) are undeployed from the node, and a table of deployed components (e.g., files) on the node is updated to reflect removal of the undeployed components. Thereafter, a fresh set of components associated with the application object are deployed to the node. The table of deployed components on the node is updated to include the loaded components.

After receiving the aforementioned components (e.g., files), during step 395 the active application engine deploys the application object and related components to a second node upon which a standby application engine resides. During deployment the active engine's host obtains a list of components that are needed by the backup engine to host application objects. The primary engine deploys the listed components to the standby engine via the RMC. It is noted that a platform running the standby application engine potentially hosts other application engines. Thus, the node hosting the standby engine potentially has some or all of a set of components needed to instantiate and execute the application object deployed on the active engine during step 390. Thus, when components are transferred over the RMC, the sender initially determines which ones of the needed components are already present on the node upon which the standby engine resides. Only the components that are not already present on the standby engine's node are transferred via the RMC during step 395.

Having described configuration and deployment of a fail-over enabled host, and more particularly an application engine that hosts a set of application objects in a hierarchical application environment, attention is directed to runtime aspects of the fail-over arrangement described herein above. After deploying the application engines to their respective platforms, in a runtime environment object instances (e.g., platforms, application engines, and application objects) associated with the configured fail-over engine pair are created, initialized and launched (if appropriate) on the host machines to carry out appropriate runtime functionality associated with a current particular role (e.g., active/standby) and status (e.g., ready/not ready) of each partner of a fail-over application engine pair.

As demonstrated below, once deployed, the operation/behavior of an application object differs substantially based upon the runtime status (e.g., active or standby) of the application object's host application engine. In an exemplary embodiment, rather than operate two equivalent host (application engine) replicas, only the active engine of the fail-over application engine pair calls startup and execute methods associated with a set of application objects during runtime. The standby application engine, while having all the necessary components needed to execute the set of application objects, assumes a standby role wherein preparatory operations are performed for executing the application objects but execution of the application objects is not commenced.

The following summarizes, by way of example, the operation of an application object after being deployed to a standby engine. Upon completing step 395 the standby engine verifies that all components (e.g., code modules) required to run the deployed application object are installed on the node. Upon confirming that all components are indeed present, the deployed application object is added to a checkpoint file maintained by the standby application engine of a fail-over engine pair. In preparation for starting the application object a pre-initialization piece of an application object, referred to as a base runtime component server, is created. Primitives associated with the deployed application object are instantiated (by invoking constructors on the primitives). Initialize methods are called on each primitive.

However, methods associated with active execution of the application objects (e.g., startup, execute, scan state, handler, etc.) are not called on the primitives associated with the application object on the standby engine. Invoking such methods, associated with an actively executing application object, is postponed until a need arises for the standby engine to take on the active application engine role/status. By not starting up and executing application objects on a standby engine, workload on the node upon which the standby engine resides is substantially reduced (on a per application object basis) after completing the invoked preparatory methods. The reduced steady-state workload associated with a standby application engine facilitates having a single platform/node host multiple backup engines.

When an application engine switches from the standby role to the active role, startup methods on the primitives that make up each hosted application object are invoked. In an exemplary embodiment, a parameter is passed into the startup method informing the primitive that it is starting up in the context of a fail-over event. Next, setscanstate methods are invoked on primitives. The scan state of the object and (now active) application engine determine whether a value of true of false is passed into the setscanstate method to determine whether the primitive will be onscan (true) or offscan (false). All onscan primitives associated with the application object are periodically executed under the supervision of the host active application engine.

Conversely, when an active engine becomes a standby engine the hosted application objects revert to an inactive ready state. In particular, all application objects are set offscan. A shutdown method is invoked on each primitive associated with the application objects and execution of the application objects ceases. However, the interfaces of the primitives are not released—facilitating fast startup in the event that the application engine re-acquires the active role of the fail-over application engine pair.

Figures 9, 11:
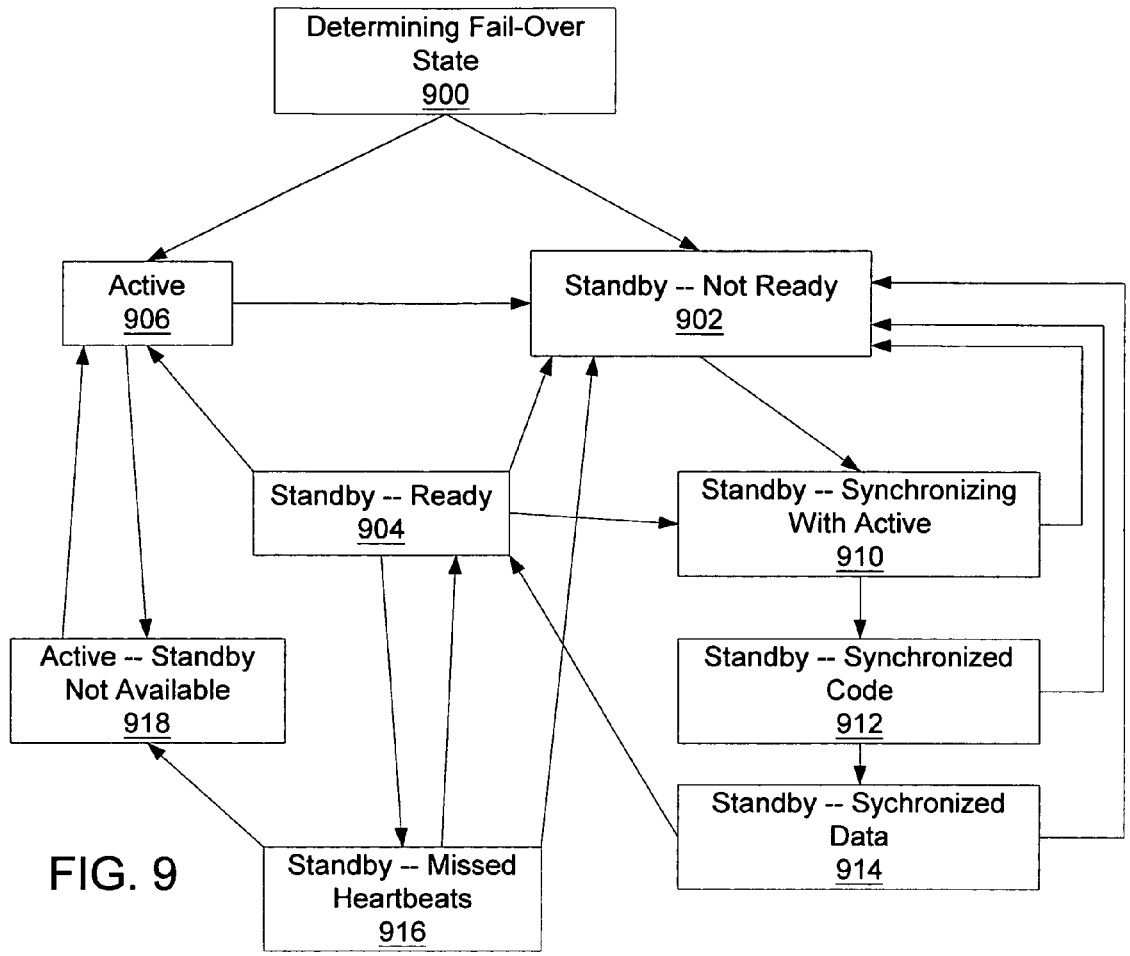
FIG. 9 is a state diagram summarizing an exemplary set of steps and transitions for a state machine embodying the operation of a fail-engine partner.
FIG. 11 identifies a set of timers associated with monitoring the health of fail-over engine pairs and the networks and nodes through which the fail-over engine pairs communicate.

In an exemplary embodiment the current/next role/status of each partner engine of a fail-over pair is tracked/governed by a state machine. FIG. 9, described herein below, summarizes the fail-over states that a fail-over-enabled application can occupy and the potential transitions between the set of exemplary states. In general, the exemplary set of states can be divided into two classes: (1) "Summary" states, and (2) "Detail" states. While in Summary states, fail-over status information is provided that is used to determine the current general operational status of a particular engine. In the illustrative embodiment, the Summary states include: Determining fail-over state 900, Standby—Not Ready state 902, Standby—Ready state 904, and Active state 906. While in Detail states, relatively more detailed information (in comparison to Summary states) is provided about the operational status of a fail-over engine partner. In particular, Detail states indicate why the active or standby engine has entered a particular sub-state. In the illustrative embodiment, the detail states include: Standby—synchronizing with active 910, Standby—synchronized code 912, Standby—synchronized data 914, Standby—missed heartbeats (from active engine) 916, and Active—standby (engine) not available 918. Each of the detail states is described further herein below.

The Determining Fail-over state 900 is the initial state of the state machine of a Fail-over-enabled engine when the engine starts up. While within the Determining Fail-over state 900 the engine, having a currently undetermined status, queries a fail-over service to retrieve the fail-over status of its fail-over partner. In response, the fail-over service executes an algorithm that attempts to determine the status of the engine's fail-over partner and, ultimately, whether the engine enters the Standby—not ready state 902 or the Active state 906.

By way of example, the fail-over service determines the status of the engine's fail-over partner by first attempting to contact the Fail-over partner via the aforementioned RMC. However, if the fail-over partner engine's status cannot be obtained (via the RMC) within a configured timeout period, then the fail-over service attempts to determine the fail-over partner engine's status via the primary network. If the fail-over partner engine's status cannot be obtained (via the primary network) within a configured timeout period, then the starting engine will assume the fail-over partner engine cannot be reached. In the event that the status of the partner engine can be determined, the fail-over service executes logic resulting in one of the two engines in a fail-over pair occupying an active state and the other occupying a standby state. In addition to the status (state/sub-state) of the partner engine, such logic takes into consideration whether the partner engine is the primary or backup engine. An exemplary state selection scenario is described herein below.

If the fail-over partner engine cannot be reached to determine its status, then the engine determines whether it can become active. An engine can become active if: (1) a valid checkpoint file that represents the last known running state of an engine exists, and (2) all code modules that are needed to restore the objects from checkpoint exist on the node where the engine is running. If the engine cannot become active then the engine will continue trying to determine the status of its fail-over partner.

The engine remains in the determining fail-over state 900 until the fail-over service establishes an appropriate fail-over state, and the engine enters either the active state 906 or the standby—not ready state 902. The following summarizes the paths out of the determining fail-over state 900. If the fail-over partner engine can't be reached, and the engine can become active then the engine: restores all hosted objects from a checkpoint; schedules the hosted objects for execution; places the restored objects in their appropriate scan state as determined by checkpoint values identifying the most recent scan state of the engine; starts executing objects; and transitions to the Active—standby not available state 918.

If the fail-over partner status is known, then the next state the engine enters depends on the fail-over status of the partner. The state machine transitions from the determining fail-over state 900 to the Active state 906 if the fail-over status of the partner is either: Standby—not ready state 902, Standby—synchronizing with active state 910, or Standby—ready state 904. On the other hand, the state machine transitions from the Determining state 900 to the Standby—not ready state 902 if the fail-over status of the partner is either: Active—standby not available state 918, Active state 906, or Standby—missed heartbeats state 916. If the fail-over status of the partner engine is the Determining Fail-over state 900, then the fail-over service will direct its engine to transition from the Determining state 900 to the Active state 906 if the partner engine is configured as the backup engine of the fail-over pair. If the partner engine is the primary engine, then the engine's state machine enters the Standby—not ready state 902.

With regard to the Active state 906, the fail-over engine state machine transitions from the Standby—ready state 904 to the Active state 906 when a fail-over on the active partner engine has been detected. While within the Active state 906, the engine schedules hosted application objects, and passes synchronization updates, including checkpoint data and subscriber list updates, to the standby engine via the RMC. The engine state machine transitions from the Active state 906 to the Standby—not ready state 902 if commanded to become a standby engine. Alternatively, the engine state machine transitions to the Active—standby not available state 918 if the engine cannot contact or loses contact with the partner engine.

With regard to the Standby—ready state 904, a standby engine enters the Standby—ready state 904 after transitioning from the Standby—not ready state 902 through a set of intermediate synchronization states/stages 910, 912 and 914 (described herein below) wherein the code and data has been synchronized with the active partner engine. While within Standby—ready state 904, the application engine performs a set of tasks differing from the tasks executed by an active application engine.

By way of example, while in the Standby—ready state 904, the application engine monitors the active partner engine for failure (e.g., verifying receipt of heartbeats from the active engine over both a primary network and over the RMC within a configured timeout period). Furthermore, the standby engine seeks to maintain certain information in synch with that of its active partner through incremental updates while within the Standby—ready state 904. However, in some cases, rather than merely perform an incremental update, the fail-over pair execute a complete re-synchronization of their information. In such case, the standby engine transitions from the Standby—ready state 904 to the Standby—synchronizing with active state 910 when the standby engine is notified that its information (updated via the RMC) is out of synch with its active partner. The standby engine receives, through the RMC, synchronization information from the active engine. The synchronization information includes checkpoint deltas/changes from the active engine. The checkpoint deltas are changes to checkpoint attribute values, associated with application objects hosted by the active engine, during a scan. Examples of checkpointed data include: configuration and tuning information relating to application objects, alarm limits, and the set of application objects deployed on the engine (including any needed code/data files used by the application objects). The standby engine also determines whether checkpoint deltas from the active engine have been missed and ensures that it has a consistent checkpoint snapshot. In addition to the above-noted checkpoint deltas, the standby engine potentially receives from the active engine via the RMC other synchronization information including: notifications when a client engine subscribes/un-subscribes to/from the active engine, alarm state changes (time stamped), and history blocks placed in a store-forward memory of the active engine.

One contemplated use of a fail-over application engine configuration involves providing fail-over functionality for a data acquisition service that transfers data to a networked process management information database. In the case where an application engine is configured to manage store-forward operations for a data acquisition server, configuring a fail-over store-forward engine arrangement and maintaining a copy of the active engine's store-forward memory limits the loss of data waiting to be transferred from the active engine's store-forward memory to a history database when fail-over occurs. Furthermore, if fail-over occurs while the active engine is in store-forward mode, then the standby engine takes over and continues in the store-forward mode until an intended destination of the store-forward data (e.g., a process information database) becomes available. When the destination database becomes available, the store-forward data acquired by the failed engine as well as the store-forward data subsequently acquired by the currently active (previously standby) engine are forwarded to the database.

The following summarizes the behavior of active and standby application engines including store-forward functionality. The store-forward functionality facilitates storing historical process and manufacturing information when a data path from the active engine to a historical database server is obstructed/interrupted. Historical data is processed the same on a fail-over enabled engine as on a non fail-over enabled engine when no failure is detected. Historical data is sent to the historical database server only from the active engine. The active engine processes historical data and sends it to the historical database server when the database server is available. If the historical database becomes unavailable (or a transmit data buffer becomes backed up due to a slow link), then the active engine stores the historical data locally and forwards the data when the historian becomes available. It is noted that, in an illustrative embodiment, loss of connectivity to the historical database does not initiate a fail-over. If an active engine loses connectivity to the historian and its standby engine can connect to the historian, then the active engine enters the store-forward mode, will commence sending store-forward updates via the RMC, and will not fail-over.

When an active application engine enters a store-forward mode of operation, the active engine synchronizes its store-forward data with its partner standby engine. The standby engine receives all of its store-forward data from its active engine. Thus upon notification of being started in a standby mode, the standby engine checks to see if it has data within its store-forward memory. If such data is present, it is purged and the standby engine waits for store-forward data from its active partner engine during an initial data synchronization stage.

In an embodiment of the invention, store-forward information synchronization is executed between active and standby engines according to a configurable repetition period. By way of example, store-forward data is written to memory in the active engine every 30 seconds. Synchronizing store-forward memory between active/standby engines also takes place every 30 seconds. Under this update scheme no more than 30 seconds of store-forward information from a previously active engine is lost during engine fail-over.

In the event of fail-over the data acquisition service hosted by the standby engine is activated and takes the place of the data acquisition service hosted by the formerly active engine.

If the data acquisition service's previously active engine was in store-forward mode then the newly active engine will be capable of continuing store-forward functionality without connecting to the historian. When connectivity to the historical database is restored, identical store-forward data collected by either engine of a fail-over pair is forwarded to the database from the currently active engine.

To facilitate management of store-forward data collected across multiple failures, and to improve diagnostics, the application engine status information includes attributes summarizing a current store-forward status of the engine. By way of example, the attributes specify values indicating: store-forward data has been collected for engine, store-forward data is currently synchronized with the standby engine, store-forward data is not synchronized with the standby engine, and time span of the store-forward data (identified by a start time and end time).

Resuming the description of the tasks performed by the engine while in the Standby—ready state, the standby engine also verifies that it is synchronized with the active engine. A standby engine is synchronized with its corresponding active engine if: (1) files installed on the active engine's node (specified through a deployment operation) are installed on the standby node; (2) all checkpoints that exist in the active engine's checkpoint file also exist in the standby engine's checkpoint file; and (3) the standby engine has verified that it has not missed any delta checkpoints, alarm state changes, or history blocks. In an illustrative embodiment, only files installed on an active node as a result of a deployment operation to that node are considered by the standby when it verifies synchronization of files. Files installed outside a deployment operation are not considered.

Multiple exit paths exist from the Standby—ready state 904. The application engine state machine transitions to the Active state 906, described herein above, in response to receiving a command to become active. Alternatively, the state machine enters the Standby—synchronizing with active state 910 in response to receiving notification that it is no longer synchronized with the active engine. Still another transition path brings the state machine to the Standby—missed heartbeats state 916 when a configurable set of heartbeats have been missed from the active engine.

With regard to the Standby—not ready state 902, an engine enters the Standby—not ready state 902 from any one of multiple states. The state machine transitions to the Standby—not ready state 902 if the standby engine has determined it has missed checkpoints and/or alarm state changes from the active engine while at the Standby—synchronized data state 914. Such communication failures are typically caused by communication failures in the RMC. However other sources of such failures include checkpoints, alarm states, and history blocks being sent faster than the standby engine can process them and alarm state changes being sent so quickly they can't be processed fast enough by the standby engine. Such failures can be avoided by adding/increasing the capacity of buffers for the data transferred via the RMC.

The state machine also transitions to the Standby—not ready state 902 when new objects are deployed to the active engine. The deployment of new objects to an engine in the Active state 906 causes the creation of checkpoints on the active engine and the installation of code modules required by the deployed objects. If the state machine is in the Standby—ready state 904 at the time new files need to be installed on the standby engine, then the state machine transitions to the Standby—not ready state 902 (or if the active engine is already detected then transitioning directly to the Standby—synchronizing with active state 910). The state machine also enters the Standby—not ready state 902 from either the Standby—synchronizing with active state 910, Standby—synchronized code state 912 or the Standby—synchronized data state 914 if the standby engine detects that communications with the active engine via the RMC are lost before the standby engine completes synchronization and enters the Standby—ready state 904.

While within the Standby—not ready state 902, the standby engine attempts to perform tasks needed to ultimately transition to the Standby—ready state 904 by synchronizing code modules and data with the active engine while successfully progressing through states 910, 912 and 914. In the illustrative embodiment of the present invention, the progression begins with a transition from the Standby—not ready state 902 to the Standby—synchronizing with active state 910 after establishing communications with the active engine via the RMC.

With regard to the Active—standby not available state 918, the application engine state machine transitions into the Active—standby not available state 918 from either an active or a standby state. The state machine transitions from the Active state 906 to the Active—standby not available state 918 if a communication failure with the standby engine, via the RMC, is sensed when transmitting the following synchronization information: checkpoint deltas, subscription notifications, or alarm state changes. A failure to transmit a store-forward history block to the standby engine will not cause a transition to the standby not available state 918 from the Active state 906.

The active engine periodically receives heartbeats from its corresponding standby engine. If a (configurable) time period for receiving a heartbeat from a standby engine expires, then the active engine state machine transitions from the Active state 906 into the Active—standby not available state 918. Furthermore, in an embodiment of the invention, the heartbeat is an indicator of a healthy platform/node, and therefore multiple heartbeats will not be sent from a platform hosting multiple standby engines to a node hosting corresponding active engines. Instead, one heartbeat message is sent from a platform hosting the multiple standby engines to the platform hosting the corresponding active engines. The frequency of heartbeats, sent from a node Y having standby engines, to a node X with active engines is the smallest configured timeout for all active engines deployed to node X that have a standby engine deployed to node Y. Alternatively, where a heartbeat is intended to indicate the health of each engine, separate heartbeats are issued for each fail-over engine. In such instances multiple heartbeats are issued between a first platform hosting multiple standby engines and a second engine hosting corresponding active engines.

The application engine state machine transitions into the Active—standby not available state 918 from the Active state 906 if the active engine receives notification, via the RMC, that the standby engine is unavailable. Examples of when such transitions occur include when the standby engine has been shutdown and is therefore no longer running.

A standby engine's state machine transitions from the Standby—missed heartbeats state 916 to the Active—standby not available state 918 if the standby engine has missed a configurable number of consecutive heartbeats from the active engine via the RMC (causing an initial transition of the standby engine's state machine from the ready state 904 to the missed heartbeats state 916), and an independent monitor issues a command to the standby engine to become active. Monitoring for failures of an active engine is discussed further herein below.

While in the Active—standby not available state 918 an active application engine hosts execution of application objects that are deployed on scan to the application engine. The active application engine periodically checks to see if the standby engine can be contacted via the RMC. Because there is no standby, the active application engine cannot be manually switched to standby (because of the absence of a current standby engine). Furthermore, the active application engine will not attempt to send checkpoint deltas (changes), subscription notifications, alarm state changes, and store-forward history data blocks—that are typically passed, via the RMC, to the standby engine.

The state machine transitions out of the Active—standby not available state 918, and into the Active state 906, if a connection is re-established with an operational corresponding standby engine.

With regard to the Standby—missed heartbeats state 916, a standby engine transitions from the Standby—ready state 904 into the Standby—missed heartbeats state 916 if a heartbeat has not been received, via the RMC or primary network, by the standby engine from the active partner's fail-over service within a configured timeout period (determined, for example by a heartbeat time out limit parameter value and consecutive missed heartbeats parameter value). Consistent with the arrangement for sending heartbeats from a standby node to an active node, a single heartbeat is sent from a node hosting multiple active engines to another node hosting their corresponding standby engines. The repetition period of heartbeats, sent from the active engine's fail-over service on active node X, to a standby node Y is the smallest configured timeout for all active engines deployed to node X that have a standby engine deployed to node Y. Other potential events causing a transition to the Standby—missed heartbeats state 916 include: the active engine failing or hanging (determined by the active engine's fail-over service through a separate timeout mechanism—see active engine timeout 1140 described herein below); and the active engine shutting down gracefully. In the latter instance, the standby engine will be notified that it is to transition to the Active—standby not available state 918.

Figure 10:
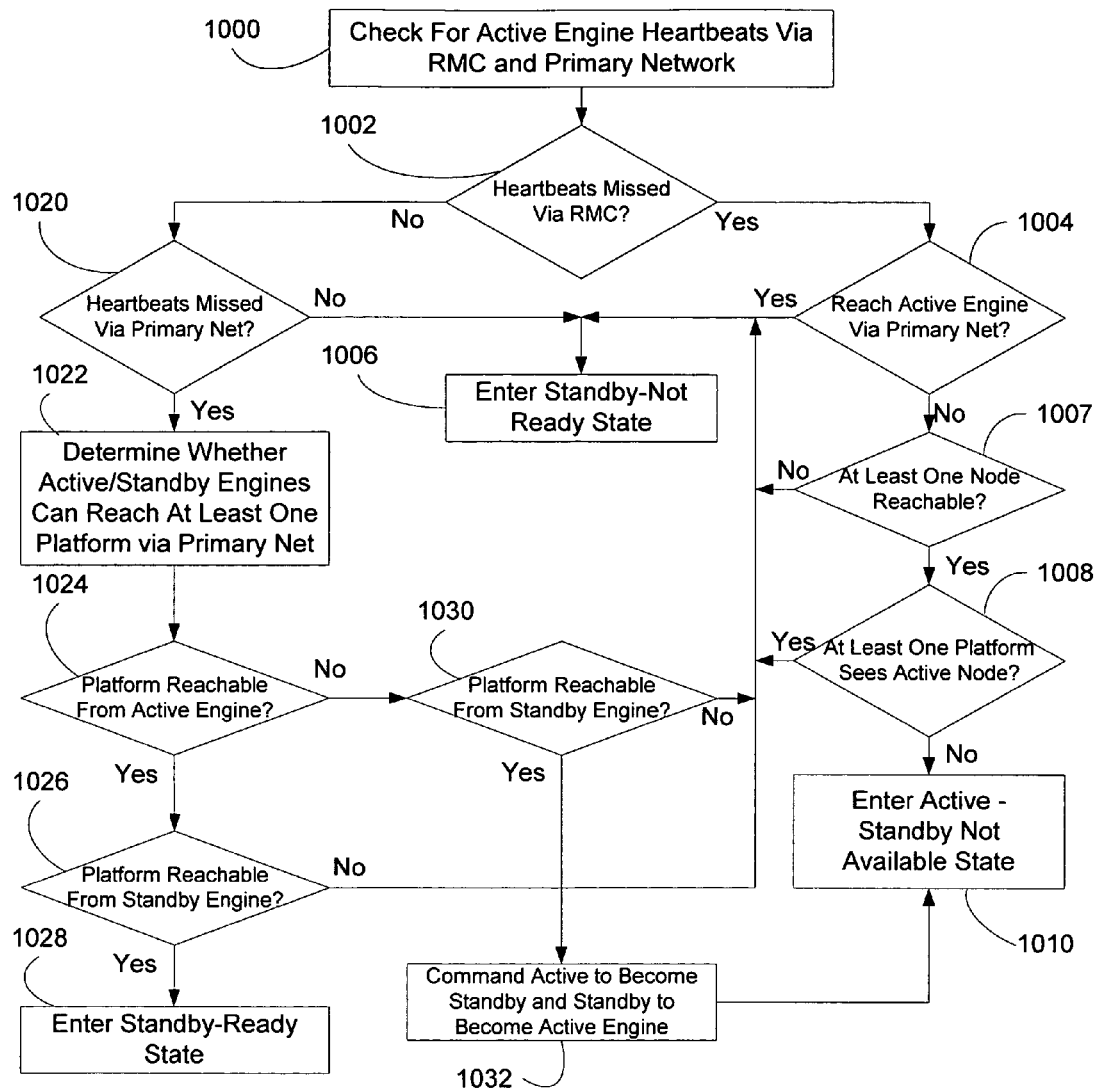
FIG. 10 is a flowchart summarizing logic performed while a fail-over engine state-machine is within the Standby—Missed Heartbeats state.

While within the Standby—missed heartbeats state 916 logic is performed to determine why the standby engine missed the heartbeats and whether the state machine for the standby engine will transition to an active mode of operation or remain in the standby mode (transitioning either to the Standby—ready state 904 or the Standby—not ready state 902). Referring to FIG. 10, during step 1000 a fail-over service for the standby engine checks for/monitors heartbeats from the active engine through both the primary network and the RMC (e.g., network 119 and link 140 of FIG. 1). At step 1002, if a currently configured number of consecutive heartbeats, sent via the RMC, have been missed, then control passes to step 1004. At step 1004 the fail-over service determines whether the active engine's node can be reached via the primary network. If the active engine's node can be reached via the primary network, then the RMC link is assumed to be down and control passes to step 1006 wherein the engine's state machine enters the Standby—not ready state 902.

Otherwise, if at step 1004 the active engine cannot be reached, then control passes to step 1007. At step 1007, if at least one other node cannot be reached via the primary network, then a communication problem probably exists in the host of the standby engine and control passes to step 1006 and the state machine enters the Standby—not ready state 902. If at least one other node can be reached via the primary network, then further tests are performed to determine whether the current active engine has failed and thus control passes to step 1008. At step 1008, if another platform node can access the active engine's node, then the active engine is assumed to still be available (and the problem lies with the standby engine's node), and control passes to step 1006. Otherwise, if at step 1008 none of the nodes can see the active engine's node, then the malfunction likely originates from the active engine's node. Control therefore passes to step 1010 wherein the standby engine enters the active engine mode. Because the fail-over partner is assumed to be out of service, during step 1010 the state machine transitions from the Standby—missed heartbeats state 916 to the Active—standby not available state 918.

Returning to step 1002, if the currently configured number of consecutive heartbeats sent via the RMC have not been missed, then control passes to step 1020 wherein the fail-over service checks whether heartbeats sent via the primary network have been missed. If a configurable number of heartbeats have not been missed, then control passes to step 1006 and the standby engine enters the Standby—not ready state (since there is apparently a problem with the RMC connection supporting communications between the active and standby engines).

However, if consecutive heartbeats have been missed via the primary network then control passes from step 1020 to step 1022. At step 1022 connectivity tests are performed to determine whether the active and standby engines can reach at least one other platform via the primary network. Thereafter, at step 1024 if at least one platform can be reached by the active engine's node via the primary network, then control passes to step 1026. At step 1026, if the standby node can reach at least one other platform via the primary network, then it is assumed that a connectivity problem exists, on the primary network, between the nodes hosting the active and standby engines. Therefore control passes from step 1026 to step 1028 and the standby engine's state machine enters the Standby—ready state 904. Otherwise a connectivity problem apparently exists between the node hosting the standby engine and all other nodes, control passes from step 1026 to step 1006, and the state machine transitions from the Standby—missed heartbeats state 916 to the Standby—not ready state 902.

Returning to step 1024, if the active engine's node cannot reach any other node on the primary network, then control passes to step 1030. At step 1030, if at least one node can be reached via the primary network from the standby node, then the active engine's primary network adapter has apparently failed and the standby should take over for the failing active engine in servicing requests from clients of the application engine. Therefore, control passes from step 1030 to step 1032. At step 1032 the current active engine is directed to enter a standby mode and the standby engine is commanded to enter an active mode. Control then passes from step 1032 to step 1010. Otherwise, if not even one node can be reached by the standby node via the primary network, then control passes from step 1030 to step 1006.

Returning to FIG. 9, a series of states are associated with synchronizing a standby engine and its corresponding active partner engine via the RMC. The Standby—synchronizing with active state 910 is entered from the Standby—not ready state 902 when the active engine is detected by the host of the standby engine via the RMC. As noted previously above, a backup/standby engine does not receive code modules for supporting application objects via the primary network, and instead receives such code modules from the primary/active engine via the RMC. While within the Standby—synchronizing with active state 910, the standby application engine synchronizes its code modules with the active engine. Therefore, any code modules on the standby engine that do not exist on the active engine are uninstalled, and any code modules on the active engine that are not installed on the standby engine are installed on the standby engine's node. Once the code modules are synchronized, the state machine transitions to the Standby—synchronized code state 912.

While within the Standby—synchronized code state 912, the standby engine synchronizes its checkpoint data and other snapshot information, including subscriber information, with the active engine. The synchronization comprises: deleting checkpoint data (including object information) or subscriber information in the standby engine's records that do not exist in the active engine; and adding checkpoint data (including object information) or subscriber information to the standby engine's records that exists on the active engine but not on the standby engine. If communication is lost over the RMC while the state machine is in the Standby—synchronized code state 912, then the state machine transitions to the Standby—not ready state 902. However, upon successfully completing synchronizing the object information, checkpoint data, and subscriber information the state machine transitions to the Standby—synchronized data state 914. While operating within the Standby—synchronized data state 914, a standby application engine completes its data synchronization processing (e.g. updating databases and directories in view of the transferred synchronization information) and transitions to the Standby—ready state 904. However, if communication is lost between the primary and standby engines while the state machine is in the Standby—synchronized data state 914, then the state machine transitions to the Standby—not ready state 902.

While operating in a fail-over mode, the active and standby engines maintain awareness of one another's status through alarms. A summary is provided herein below of the various alarm states and their role in governing the transitions and operation of the state machines.

Below is summary of the various alarms associated with fail-over that will be reported when standby and active engines transition between the previously described fail-over states. The alarm description of all the alarms reported contain: the engine fail-over partner's node name, the summary state and detail state if applicable, the node name of the engine reporting the alarm, and the name of the engine reporting the alarm. To simplify Table 1, only summary states are identified. Any transitions from a previous state to a current state or sub-state of the current state will cause this alarm to occur.

TABLE 1

| Alarm Name | Previous State | Current State | Alarm cleared when enter | Alarm reported by |
|---|---|---|---|---|
| Standby not Ready | Active | Standby - Not ready | Standby - ready | Active engine |
| Standby not available | Active | Active - standby not available | Active | Active engine |

With regard to the Standby not ready alarm, the active engine monitors the status of the standby engine, via the RMC, to determine when to raise the alarms mentioned in Table 1. Furthermore, if the active engine is in the standby unavailable state this alarm will not be generated.

Table 2 summarizes the alarms reported whenever a fail-over occurs.

TABLE 2

| Alarm Name | Alarm raised when | Alarm cleared when | Alarm reported by |
|---|---|---|---|
| Fail-over occurred | When standby becomes active | During the next scan of the active engine | Active engine |
| Standby history data out of sync | When Active engine fails to update standby with history blocks | When the history data in active and standby engines are in sync | Active engine |
| Standby alarm data out of sync | When Active engine fails to update standby with alarm data | When the alarm data in active and standby engines are in sync. | Active engine |

In addition to the above alarms, the consecutive heartbeats missed over RMC and consecutive heartbeats missed over primary network will be provided as attributes that can be extended by the user to report alarms if desired.

Turning briefly to FIG. 11, a set of timers/limits are identified that are associated with the fail-over engines. These timers are utilized to ensure proper tracking of the health of the fail-over engine pair and the networks and hosts through which they communicate. A primary network communication timeout 1100 is used, by way of example, by an engine while in the determining fail-over state 900 when the engine attempts to determine the state of its fail-over partner via the primary network (e.g., network 119). The primary network timeout is independently configurable, and exists as an attribute which can be modified at configuration time and runtime.

A standby engine heartbeat timeout 1110 is used, by way of example, by the active engine while in the active state 906 to determine whether the active engine has lost communication with the standby engine via the RMC. The heartbeat timeout is configurable both at runtime and configuration time from the active engine, is deployed over to the active engine, persists across engine restarts, and is assigned a default of 2 seconds.

An active engine heartbeat timeout 1120 is used, by way of example, by the standby engine while in the standby—ready state 904 to determine whether the standby engine has missed heartbeats from its fail-over partner via the RMC. A missed heartbeat is registered (and the standby engine transitions to the standby—missed heartbeats state 916) if the standby engine has not received, via the RMC, a heartbeat from its active engine partner within the time period specified by the active engine heartbeat timeout. The active engine heartbeat timeout is configurable at configuration time and runtime from the active engine, persists across engine restarts, and is assigned a default of 5 seconds.

A consecutive heartbeats missed limit 1130 specifies the consecutive number of heartbeats missed between the active and standby engines via the primary network or RMC (utilized during the Standby—missed heartbeats state 916). The consecutive heartbeats missed limit is configurable from the active engine at configuration time and runtime, persists across engine restarts, and has a default value of 2. The default value of 2 implies that 2 heartbeats must be missed in a row in order for the consecutive number of heartbeats missed condition to become true and cause a fail-over. Missing a single heartbeat brings the standby engine's state machine into the Standby-missed heartbeats state 916.

An active engine timeout limit 1140 specifies a timeout period within which an active engine must notify its fail-over service, running on the same platform as the active engine, that it's still functional. If the timeout period is exceeded, the system will determine that the active engine has failed or hung and initiate a fail-over sequence wherein a standby partner of a fail-over configured engine is commanded to become active, and clients/subscribers are informed of fail-over related events. The active engine timeout limit is configurable during configuration and runtime, persists across engine restarts, and a default value is specified in a primitive specification.

A subscribed engine node connection timeout 1150 specifies a period utilized by the standby—missed heartbeats fault resolution scheme (see, FIG. 10) to wait for a response from nodes that have engines subscribed to the active engine to determine whether they can see the active engine. The subscribed engine node connection timeout is configurable at configuration and runtime, persists across engine restarts, and a default value is specified in a primitive specification.

Detecting Active Engine Failures Effecting Clients/Subscribers

Another aspect of the runtime operation of a fail-over host pair is reliably detecting an active host malfunction and ensuring that client/subscribers timely re-connect to a (previously) standby host when fail-over occurs. A monitoring scheme is described herein below that reduces communications load associated with monitoring the operational status of an active hosts while maintaining a high degree of confidence that when an active host ceases to function, the failure is detected and clients of the failed active host quickly reconnect to the (previously) standby host of a fail-over pair.

A first aspect of sensing engine/host failures involves detecting failure of a node upon which an active host currently resides. One way to monitor the status of a node is the use of heartbeats. However, heartbeats consume network resources and tie up computing resources. Therefore, in an exemplary embodiment, heartbeats associated with node status are limited with regard to their intended recipients. Heartbeats are not sent by a publisher (e.g. an application engine) to clients/subscribers. For example, heartbeats are not sent to a plant floor visualization application instance that subscribes to a tag on an application object hosted by an engine. In cases where a client/subscriber and a publisher are on differing nodes, heartbeats are sent between nodes (platforms) hosting publishers (engines) and related clients/subscribers. When heartbeats are expected by a node and they are not received within a configured time period, then a monitoring mechanism assumes that: the node or it's network adapter have failed, and the network path between the two nodes has failed. The rate at which heartbeats are sent between two nodes: is configurable on a platform both at runtime and configuration time (limited at runtime to users with tuning permissions); persists across platform restarts; is a minimum of 250 milliseconds, and defaults to 2500 milliseconds.

An error is sensed when a configurable number of consecutive heartbeats are missed. The number of consecutive heartbeats missed by a node hosting an active engine of interest: is configurable on a platform both at runtime and configuration time (limited at runtime to users with tuning permissions); persists across platform restarts; and will default to two. If a configured number of consecutive heartbeats from a node is missed, then a failure of the node, from which the heartbeats were expected, is assumed, and all clients that expect data from this failed node are notified of the assumed failure by monitoring services residing on their host nodes.

A second aspect of sensing engine/host failures involves detecting a failure of the engine itself (without its host node/ platform going down). In contrast to using heartbeats, a separate monitoring process determines, and informs clients, that a particular engine is no longer available for a broad variety of circumstances. Examples of such circumstances include when the application engine has been shut down, failed (e.g., crashed unexpectedly), or hung (i.e., though still operating, is not receiving/responding to messages passed to it by the platform upon which it resides).

Figure 12:
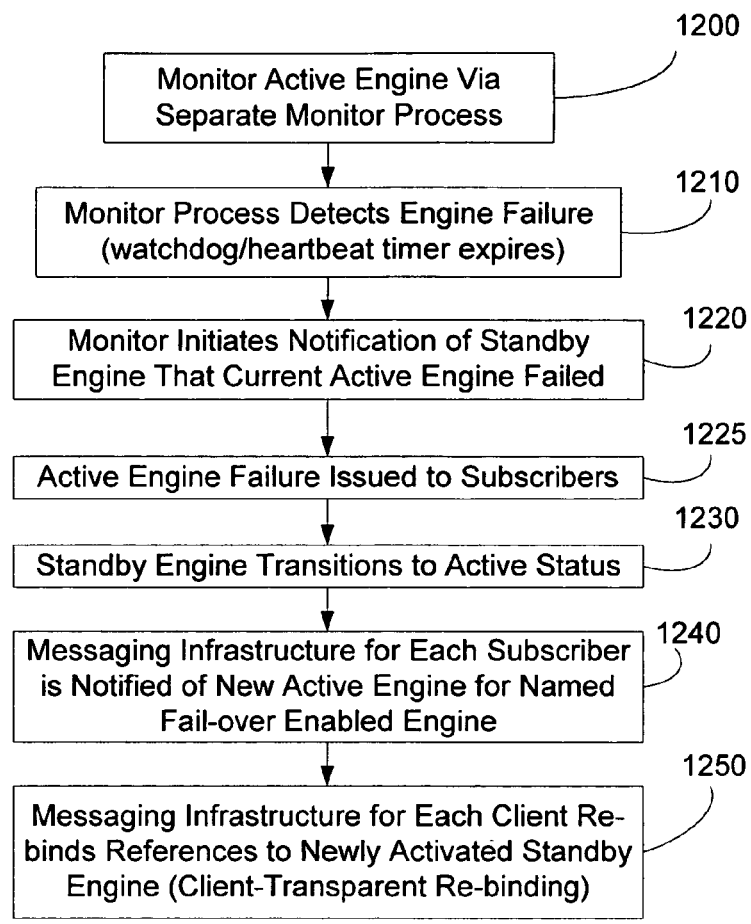
FIG. 12 is a flowchart summarizing an exemplary set of steps for carrying out fail-over in a redundancy enabled host providing access to real time data, historical data, and alarm data to a set of client/subscribers.

Referring to FIG. 12, a sequence of steps summarize a progression of stages associated with monitoring for and responding to an active application engine failure by notifying a messaging infrastructure serving clients/subscribers (e.g., WONDERWARE's INTOUCH human machine interface) to the engine located on other network nodes so that the messaging infrastructure for the clients/subscribers can take steps to update data connections to reference the (previous) standby partner of a fail-over engine configuration. In summary, rather than rely upon transmitting a periodic heartbeat to each client, a separate process, executing upon a same machine as the active engine, monitors the active engine's health. The monitoring process notifies a fail-over service of the standby engine when a failure of the active engine is detected. Thereafter, the fail-over service informs the messaging infrastructure serving clients/subscribers to the failed-over engine of the new active engine's status.

During stage 1200, a separately executing monitoring process (e.g., the bootstrap process on the computing system upon which an application engine is running) monitors the health of the active application engine. The monitoring process receives periodic notifications from the active application engine according to a time interval. The interval is individually configurable for each engine both at runtime and configuration time. However, runtime configuration will be limited to users having tune permissions, and the interval persists across engine restarts. Monitoring the health of an engine by a process operating on a same node reduces network workload in comparison to a scheme where clients are individually informed of an engine's health via heartbeats.

During stage 1210 the monitoring process detects the active application engine has shutdown, crashed, or hung. In response, at stage 1220 the monitoring process initiates notifying the standby engine that the previously active engine is not operational. By way of example, the monitoring process notifies a fail-over service on its own machine that, in turn, notifies (via the RMC) a fail-over service on the same platform as the standby engine, that the standby engine is to become active.

During step 1225 the fail-over service on the standby engine, utilizing the subscriber/client information previously passed via the RMC, issues an active engine failure notification to the messaging infrastructure (e.g., local message exchange—LMX) for each client/subscriber to the failed engine. The active engine failure notification message identifies: the failed engine (by handle), the new active engine (by handle), and a time period within which the new active engine will complete startup.

At step 1230, the standby engine transitions from the Standby—ready state 904 to the Active state 906 (see, FIG. 9). By way of example, the fail-over service updates the status of the standby engine to reflect that the engine is transitioning to active status (state transition from Standby—Ready 904 to Active 906 in FIG. 9). Thereafter, the fail-over service directs the standby engine to commence running in the active state (e.g., invoke startup methods on each of its hosted application objects, etc.). The now active application engine notifies the fail-over service when its startup procedures are complete. In response the fail-over service updates the status of the "transitioning" engine to reflect that the engine is now active (see, Active state 906) and executing its hosted application objects.

Thereafter, at step 1240, the fail-over service for the now active (previously standby) engine, utilizing the subscriber/client information previously passed via the RMC, notifies the messaging infrastructure (e.g., LMX) for subscribers/clients (e.g., INTOUCH plant/process visualization application) that the former standby engine is now the active partner. The active status notification message to the messaging infrastructures that serve subscribing clients includes: an engine identification of the now active engine (by handle) and an "active" status identifier.

Thereafter at step 1250, with complete transparency to the client/subscriber, the messaging infrastructures update their routing tables with regard to all references affected by the change to the new active engine. The message exchange handle for each data/attribute reference previously associated with the failed engine replaced by a handle corresponding to the reference on the new active engine of the fail-over pair. As a consequence, without changing any reference strings used by the client/subscribers (i.e., with client-transparency), all data subscriptions with the failed active engine are re-routed/connected to the new active engine.

In the role-based redundant engine arrangement described herein above, the primary and backup engines, while hosted by distinct physical platforms, are treated as a single logical entity (e.g., client references to objects/attributes hosted on the engine pair partner do not distinguish between the two entities that make up the fail-over engine pair) within a global/unified name space. A same name is assigned to both the primary and backup engines of a fail-over pair, and the engines are distinguished by operations performed based upon their current role/status. Therefore, clients/subscribers of a redundant engine issue their requests to a logical fail-over enabled engine entity encompassing both the primary and backup engines. The messaging and naming services transparently resolve the reference/name strings to an identifier for the currently active application engine of the fail-over enabled engine pair without any knowledge of the clients. This potentially results in a streamlined process for: switching active server/publisher engines in a fail-over pair, and relocating application engine objects to new platforms within a network.

Upon receiving notification that the standby engine is now running active, the messaging component (e.g., Message Exchange) switches, by way of example, a set of three different types of references to attributes from the failed engine to the new active engine.

Supervisory references—including references for: modifying attributes (supervisory sets that are not subject to security), monitoring changes to attribute (supervisory gets with subscription), and retrieving data from an attribute (supervisory gets without subscription).

User references—including references for: modifying attributes (user sets associated with logged on users that are subject to security), monitoring changes to an attribute (user gets with subscription), retrieving data from an attribute (user gets without subscription), and pre-binding references.

System references—including references for: modifying attributes (system sets such as ones associated with a global network repository/database of system information), monitoring changes to attribute (system gets with subscription), and retrieving data from an attribute (system gets without subscription).

In an exemplary embodiment, the process of switching references is transparent to message exchange clients. The clients utilize location-independent names from a global namespace (maintained by the global name table 125) to reference attributes associated with the fail-over enabled application engines. As a result, when fail-over to a standby engine on a different network node occurs, none of the reference names used by the clients change (since the reference names are equally applicable to an activated primary or backup application engine).

After the former standby engine commences operating as the active engine, clients receive a data update, for subscriptions, containing the current value of the attribute on the newly activated engine. If the delta/delay time between when the client engine receives notification of the active engine's failure and the time the client engine receives notification that the standby has become active exceeds a configured limit then the quality of data associated with all referenced attributes will be set to "bad" until receiving the data updates from the newly activated engine. The configured limit (with a default of 15 seconds) is configurable at runtime and configuration time for all engines within the scope of the global namespace, and persists across engine restarts.

Global Namespace/Relocating an Active Engine

The above-described fail-over engine configuration and deployment architecture is integrated with a global/unified name space that supports network location independence through name-based access to the application engines. The engines are identified by location-independent names. In the global namespace, references are resolved from physical location-independent references to network addresses by a name service. Under such circumstances, when an engine relocates, only the name service needs to be informed of the new address for the named engine. The name/reference associated with the relocated engine is location-independent, and therefore does not change when the engine is moved to a new platform within a network. Contact with a relocated application engine is established by its clients through re-binding requests submitted to the naming service.

Figure 13:
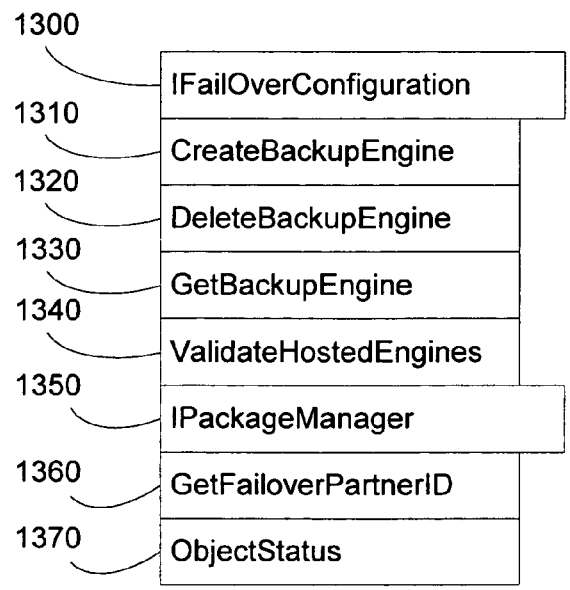
FIG. 13 comprises an exemplary set of interfaces/methods that support a redundancy fail-over host pair.

Turning to FIG. 13, a configuration database interface is summarized that facilitates the above-described fail-over functionality in a host (e.g., an application engine that supports a set of application objects) in a process control and manufacturing information system environment.

An IFailOverConfiguration interface 1300 is a primary interface for creating a fail-over host (e.g., application engine pair). The IFailOverConfiguration interface 1300 includes a set of methods including a CreateBackupEngine method 1310. The CreateBackupEngine method 1310 creates a backup fail-over engine object in the configuration database 124. The CreateBackupEngine method 1310, if successful, returns a pointer/reference to an identification for the newly created backup engine object. A DeleteBackupEngine method 1320 deletes a previously created backup fail-over engine object from the configuration database 124. The DeleteBackupEngine method 1320 is called if, during configuration of an application engine a user did not check the Enable redundancy checkbox 404. A GetBackupEngine method 1330 returns a reference to a backup engine object. A ValidateHostedEngines method 1340 validates (checks configuration) of all application engines assigned to an identified platform.

An IPackageManager interface 1350, a general interface that manages the object packages within the configuration database 124, comprises a GetFailOverPartnerId method 1360. The GetFailOverPartnerId method 1360 receives, as input, an identification of a fail-over partner engine object. The GetFailOverPartnerId method 1360 returns a reference to the partner engine object. An ObjectStatus method 1370 returns a set of status bits corresponding to the present status of an application object. Exemplary status information includes whether the object is: a template, hidden, checked out, pending update, deployed, primary engine, backup engine, and fail-over enabled.

In view of the many possible embodiments to which the principles of this invention may be applied, it should be recognized that the embodiments described herein with respect to the drawing figures are meant to be illustrative only and should not be taken as limiting the scope of the invention. Furthermore, the illustrative steps may be modified, supplemented and/or reordered without deviating from the invention. Therefore, the invention as described herein contemplates all such embodiments as may come within the scope of the following claims and equivalents thereof.

What is claimed is:

1. A method for maintaining transparency between fail-over host partners for data acquisition clients of a redundancy-enabled host in a supervisory process control data acquisition application runtime environment, the method comprising the steps:

maintaining a name resolution table including a set of entries, each entry including a name and a corresponding network address, for mapping location-independent reference names to network location-specific addresses for named entities;

creating a single entry in the name resolution table including a location-independent reference name and a network address, the single entry corresponding to the redundancy-enabled host comprising both an active host partner and a standby host partner; and providing a messaging infrastructure for a client of the redundancy-enabled host, wherein the messaging infrastructure locally maintains a location-independent reference name-to-network address translation, based upon the single entry in the name resolution table, for resolving location-independent reference names of the client to data sources on the redundancy-enabled host, and wherein a single location-independent reference name is used by the client to reference data on the redundancy-enabled host treated as a single named entity and without regard to which partner of the redundancy-enabled host is presently active.

2. The method of claim 1 further comprising:

receiving, by the messaging infrastructure, a notification that a standby partner of the redundancy-enabled host is now the active partner; and updating, in response to receiving the notification, the location-specific address, within the single entry in the name resolution table corresponding to the location-independent reference name assigned to the redundancy-enabled host, with the location-specific address corresponding to the standby partner that is now the active partner.

3. The method of claim 2 wherein a fail-over service, operating separately on a same computing node as the standby partner of the redundancy-enabled host, issues the notification to the messaging infrastructure.

4. The method of claim 1 wherein the messaging infrastructure comprises a local message exchange.

5. The method of claim 4, wherein client references to attributes on the redundancy-enabled host include supervisory references.

6. The method of claim 4 wherein client references to attributes on the redundancy-enabled host include user references.

7. The method of claim 4 wherein client references to attributes on the redundancy-enabled host include system references.

8. The method of claim 1 wherein the messaging infrastructure determines whether fail-over to the previously standby host partner completed within a specified period, and specifies a warning to data clients if an elapsed period for the standby partner to become active exceeds the specified period.

9. The method of claim 1 wherein the location-independent reference name is unique within a network scope covered by the messaging infrastructure.

10. The method of claim 1 wherein the redundancy-enabled host comprises an application engine that hosts a set of application objects that are executed only upon the active one of the redundancy-enabled host.

11. A system providing transparency between fail-over host partners for data acquisition clients of a redundancy-enabled host in a supervisory process control data acquisition application runtime environment, the system comprising:

a name resolution table including a set of entries, each entry including a name and a corresponding network address, for mapping location-independent reference names to network location-specific addresses for named entities;

a single entry in the name resolution table including a location-independent reference name and a network address, the single entry corresponding to the redundancy-enabled host comprising both an active host partner and a standby host partner; and a messaging infrastructure serving a client of the redundancy-enabled host, wherein the messaging infrastructure locally maintains a location-independent reference name-to-network address translation, based upon the single entry in the name resolution table, for resolving location-independent reference names of the client to data sources on the redundancy-enabled host, and wherein a single location-independent reference name is used by the client to reference data on the redundancy-enabled host treated as a single named entity and without regard to which partner of the redundancy-enabled host is presently active.

12. The system of claim 11 further comprising within the messaging infrastructure, executable program components that facilitate:

receiving, by the messaging infrastructure, a notification that a standby partner of the redundancy-enabled host is now the active partner; and updating, in response to receiving the notification, the location-specific address, within the single entry in the name resolution table corresponding to the location-independent reference name assigned to the redundancy-enabled host, with the location-specific address corresponding to the standby partner that is now the active partner.

13. The system of claim 12 wherein a fail-over service, operating separately on a same computing node as the standby partner of the redundancy-enabled host, issues the notification to the messaging infrastructure.

14. The system of claim 11 wherein the messaging infrastructure comprises a local message exchange.

15. The system of claim 14 wherein client references to attributes on the redundancy-enabled host include supervisory references.

16. The system of claim 14 wherein client references to attributes on the redundancy-enabled host include user references.

17. The system of claim 14 wherein client references to attributes on the redundancy-enabled host include system references.

18. The system of claim 11 further comprising data quality management logic that determines whether fail-over to the previously standby host partner completed within a specified period, and specifies a warning to data clients if an elapsed period for the standby partner to become active exceeds the specified period.

19. The system of claim 11 wherein the location-independent reference name is unique within a network scope covered by the messaging infrastructure.

20. The system of claim 11 wherein the redundancy-enabled host comprises an application engine that hosts a set of application objects that are executed only upon the active one of the redundancy-enabled host.

* * * * *